US007664569B2

(12) United States Patent
Shimizu et al.

(10) Patent No.: US 7,664,569 B2
(45) Date of Patent: Feb. 16, 2010

(54) ROBOT DEVICE OPERATION CONTROL DEVICE AND OPERATION CONTROL METHOD

(75) Inventors: Satoru Shimizu, Kanagawa (JP); Jinichi Yamaguchi, 5-14-38, Tamadaira, Hino-shi, Tokyo 191-0062 (JP); Yoshihiro Kuroki, Kanagawa (JP)

(73) Assignees: Sony Corporation, Tokyo (JP); Jinichi Yamaguchi, Tokyo (JP)

( * ) Notice: Subject to any disclaimer, the term of this patent is extended or adjusted under 35 U.S.C. 154(b) by 882 days.

(21) Appl. No.: 10/498,149

(22) PCT Filed: Oct. 10, 2003

(86) PCT No.: PCT/JP03/13083

§ 371 (c)(1),
(2), (4) Date: Mar. 10, 2005

(87) PCT Pub. No.: WO2004/033160

PCT Pub. Date: Apr. 22, 2004

(65) Prior Publication Data

US 2005/0165507 A1     Jul. 28, 2005

(30) Foreign Application Priority Data

Oct. 10, 2002    (JP)   ................ 2002-297206

(51) Int. Cl.
*G06F 19/00* (2006.01)
(52) U.S. Cl. .............. 700/245; 700/247; 700/248; 700/249; 700/258; 700/259; 318/568.11; 318/568.12; 318/568.2; 318/569; 901/1; 901/15; 901/47

(58) Field of Classification Search .......... 700/66, 700/245, 246, 247, 248, 249, 250, 253, 257, 700/260, 262, 264, 275, 261, 300; 318/9, 318/443, 568.12, 568.22, 580, 653, 800; 701/23, 25; 901/1, 9, 46, 47; 180/8.6
See application file for complete search history.

(56) References Cited

U.S. PATENT DOCUMENTS 6,301,524 B1 * 10/2001 Takenaka ............... 700/245

(Continued)

FOREIGN PATENT DOCUMENTS

JP     2002-210681     7/2002

(Continued)

OTHER PUBLICATIONS

Pratt, Exploiting Inherent Robustness and Natural Dynamics in the Control of Bipedal Walking Robots, 2000, p. 1-157.*

(Continued)

*Primary Examiner*—Khoi Tran
*Assistant Examiner*—McDieunel Marc
(74) *Attorney, Agent, or Firm*—Frommer Lawrence & Haug LLP; William S. Frommer; Thomas F. Presson

(57) ABSTRACT

A ZMP equilibrium equation stating the relationship of various moments applied to a robot body of a robot, based on desirable motion data made up by trajectories of respective parts, imaginarily divided from the robot body, is generated, and moment errors in a ZMP equilibrium equation are calculated. A priority sequence of the parts, the target trajectories of which are corrected to cancel out the moment errors, is set. The target trajectories are corrected from one part to another, in a sequence corresponding to the priority sequence, to compensate the moment errors.

11 Claims, 8 Drawing Sheets

U.S. PATENT DOCUMENTS

| | | | |
|---|---|---|---|
| 6,480,761 B2 * | 11/2002 | Ueno et al. | 700/245 |
| 6,802,382 B2 * | 10/2004 | Hattori et al. | 180/8.6 |
| 6,832,132 B2 * | 12/2004 | Ishida et al. | 700/245 |
| 6,901,313 B2 * | 5/2005 | Mori et al. | 700/245 |
| 2002/0007230 A1 * | 1/2002 | Ueno et al. | 700/245 |
| 2003/0144763 A1 * | 7/2003 | Mori et al. | 700/245 |

FOREIGN PATENT DOCUMENTS

| | | |
|---|---|---|
| JP | 2002-346957 | 12/2002 |

OTHER PUBLICATIONS

Nicholls, Bipedal Dynamic Walking in Robotics, 1998, Internet p. 1-86.*

Ishida T et al: "Motion entertainment by a small humanoid robot based on Open-R" Proceedings of the 2001 IEEE/RSJ International Conference on Intelligent Robots and Systems. (IROS 2001). Maui, Hawaii, Oct. 29-Nov. 3, 2001, IEEE/RSJ International Conference on Intelligent Robots and Systems, New York, NY: IEEE, US, vol. vol. 1 of 4, Oct. 29, 2001, pp. 1079-1086, XP010571840 ISBN: 0-7803-6612-3.

* cited by examiner

ROBOT DEVICE OPERATION CONTROL DEVICE AND OPERATION CONTROL METHOD

TECHNICAL FIELD

This invention relates to a motion controlling apparatus and a motion controlling method for a robot apparatus having at least plural mobile parts, and to a computer program. More particularly, this invention relates to a motion controlling apparatus and a motion controlling method for a mobile robot apparatus having mobile legs, in which posture stabilizing control is performed using ZMP as a criterion for verifying the stability, and to a computer program.

Still more particularly, the present invention relates to a motion controlling apparatus and a motion controlling method for a robot apparatus having at least plural mobile parts, and to a computer program, in which the target (desirable) trajectories for respective parts of the robot body are corrected to compensate a moment of an unknown external force and an unknown external force.

The present application claims priority of Japanese Patent Application No. 2002-297206, filed in Japan on Oct. 10, 2002, the entirety of which is incorporated by reference herein.

BACKGROUND ART

A mechanical apparatus for performing movements like those of the human being, using electrical or magnetic operations, is termed a "robot". The etymology of the term robot is said to be "ROBOTA" (slave machine) of the Slavonic language. The robot started to be used in this nation extensively in later sixties. Most of the robots used were industrial robots, such as manipulator and a transport robot, aimed to automate the production operations in plants or to perform unmanned operations in plants.

In recent years, developments of utility robots, supporting the human life as a partner to the human being, that is, supporting the human activities in various aspects in our everyday life, are progressing. In distinction from a crawler type robot, or a robot walking on four or six legs, the robot erected and walking on two legs is labile and experiences increasing difficulties in posture or walking control. However, the robot erected and walking on two legs is superior in being able to realize flexible motion operations, such as by coping with walking surfaces presenting protuberances or recesses, as when the robot walks on an untrimmed terrain, with walking surfaces presenting obstacles on a working route, or with non-continuous walking surfaces, as when he robot has to go up or down a stairway or a ladder.

The legged mobile robot, simulating the living mechanism or movements of the human being, is termed a "humanoid" or a "humanoid robot". The humanoid robot is able to support the human life, that is, able to support human activities in various aspects in our everyday life, such as in our living environment.

The working space or the living space of the human being is mostly formed to the bodily mechanism and action patterns proper to the human being, erected and walking on two legs, while presenting many obstacles to the motion of the mechanical system of the current state of the art, having wheels or other driving devices as motion means. Hence, if such mechanical system, that is, a robot, is to perform various human operations to take the place of the human being and to adapt itself to our living space, it is desirable that the range of possible motion of the robot is approximately equal to that of the human being. This accounts for general expectations entertained for putting the legged mobile into practical use.

A great variety of technologies pertinent to posture control or stable walking of the two-legged mobile robot have already been proposed. The stable "walking" may be defined as "motion on legs without falldown". The stable posture control for a robot is crucial for avoiding the falldown of the robot because the falldown means interruption of the operations being carried out by the robot and considerable labor and time are needed for the robot to rise from the falldown state to reinitiate the operations. Moreover, such falldown is likely to inflict fatal damages to the robot itself or to a counterpart object against which the robot collides in the course of falldown thereof.

The majority of the proposals for stable posture control of the robot and prevention of falldown during walking use the ZMP (zero moment point) as the criterion for verifying the walking stability. The criterion for verifying the stability by ZMP is based on the 'D' Aembert's principle' that the force of gravity, the force of inertia and the moment thereof in a direction from the floor surface to the walking system, counterbalance the force of reaction from the floor and the moment thereof in a direction from the floor surface to the walking system. As a conclusion of the mechanical inference, there is a point of zero pitch axis moment and zero roll axis moment inwardly of a support polygon defined by the floor contact point of the foot sole and the floor surface, that is, a ZMP stable area (see, for example, Miomir Vukobratovic, "Legged Locomotive Robots" (translated by Ichiro KATO et al., "Walking Robot and Artificial Leg", published by NIKKAN KOGYO SHIMBUN-SHA).

In sum, the ZMP criterion is that if, in all instants of walking, the ZMP exists inwardly of a support polygon defined by the foot and the floor surface, and there acts a force in a direction the robot thrusts the floor surface, the robot can walk in stability without falldown (i.e. without the robot body performing rotating motion).

The generation of a two-legged walking pattern, based on the ZMP criterion, has a merit that the touchdown point of the foot sole can be previously set and that account may readily be taken of kinematic constraint conditions of the foot sole in keeping with the floor surface profile. Moreover, using the ZMP as the criterion for verifying the stability means handling the trajectory rather than the force as a target value for kinematic control, and hence raises technical feasibility.

For example, the legged mobile robot is able to perform stabilized walking in such a manner that a point on a floor surface corresponding to the zero ZMP coincides with a target value (see, for example, the Japanese Laid-Open patent Publication H-5-305579).

Moreover, the legged mobile robot may be constructed so that the ZMP will be inside a support polyhedron (polygon) or so that the ZMP will be at a distance with a certain allowance from an end part of the support polygon at the time of touchdown or clearing the floor (see for example the Japanese Laid-Open patent Publication H-5-305581). In this case, there is an allowance of the ZMP by a certain preset distance, even under occurrence of interference, thus improving stability of the robot body during walking.

The walking speed of the legged mobile robot may also be controlled by a ZMP target position (see, for example, the Japanese Laid-Open Patent Publication H-5-305583). That is, pre-set walking pattern data are used, and the joints of the leg parts are driven so that the ZMP coincides with a target position. The tilt of the upper body is detected and the walking pattern data emitting rate is changed depending on the detected value. In case the robot treads on an unknown irregular surface and thus leans forward, the emitting rate is quickened to recover the posture. Since the ZMP is controlled to the target position, the emitting rate may be changed without any inconvenience if the emitting rate is changed during the time both leg units of the robot are in the stance position.

On the other hand, the touchdown position of the legged mobile robot may be controlled by the ZMP target position (see for example the Japanese Laid-Open patent Publication H-5-305585). That is, in the legged mobile robot, described in this Patent Publication, the deviation between the ZMP target position and the actually measured position is detected. In order to eliminate this deviation, one or both of the leg units are driven, or the moment about the ZMP target position is detected and the leg units are actuated to reduce the moment to zero such as to realize stable walking.

The leaning posture of the legged mobile robot may also be controlled by the ZMP target position (see for example the Japanese Laid-Open patent Publication H-5-305586). That is, the moment about the ZMP target position is detected and, if such moment is produced, the leg units are driven such as to reduce the moment to zero, in order to effect stable walking.

The posture stabilizing control of the robot, employing the ZMP as the criterion for verifying the stability, resides in searching a point of zero pitch axis moment and zero roll axis moment within a support polygon defined by the touchdown point of the foot sole and the floor surface.

However, as a result of the a priori validation by the present inventors, it has become clear that, when the robot performs high-speed leg movements, not only the moments about the pitch axis and about the roll axis of the robot body, but also the moment about its yaw axis, is produced.

FIG. 1 shows an illustrative relationship between the walking speed [second/step] of the two-legged mobile robot and the moment [Nm] generated in the yaw axis direction. As may be seen from this figure, the shorter the time needed per step of the legged mobile robot, that is, the higher the walking speed, the larger becomes the moment about the yaw axis to a marked extent.

Such moment about the yaw axis produces an action of causing the swinging movement of the robot body, sooner or later, producing a slip about the yaw axis between the foot sole of the robot and the floor surface to affect the walking stability appreciably or otherwise proving a hindrance in the realization of the stable and accurate legged operations in an expected manner. If the factor of the moment about the yaw axis becomes excessive, robot falldown may be produced to destruct the robot body and an article against which the robot falls.

On the other hand, the legged mobile robot is made up by a plurality of part groups, such as left and right upper limbs, left and right lower limbs and a body trunk, and includes a large variety of degrees of freedom of the joints. It is however not known precisely how the plural parts are to operate in concert in order to cancel out the moment errors applied to the robot body about the roll, pitch and yaw axes during its movements, such as walking.

In the posture stabilizing control for the robot, employing ZMP as a criterion for verifying the stability, a point with the zero pitch axis moment and the zero roll axis moment is searched within a support polygon defined by the floor touch point of the foot sole and the floor surface. However, in case both leg units have cleared the floor surface, such as when the robot has jumped or descended from an elevated object, there is no support polygon, such that the conventional technique of controlling the ZMP to be within the inside of the support polygon cannot be applied.

It is an object of the present invention to provide a method and an apparatus optimum for controlling the operation of the robot apparatus, and a computer program, in which the target trajectory for each part on the robot body may be corrected to compensate an unknown external moment or an unknown external force.

It is another object of the present invention to provide a method and an apparatus optimum for controlling the operation of the robot apparatus, and a computer program, in which the moment error applied to the robot body about the roll, pitch and yaw axes during the robot's movements, such as walking, may be canceled out with advantage by concerted operations of the respective part groups making up the robot body.

It is another object of the present invention to provide a method and an apparatus optimum for controlling the operation of the robot apparatus, and a computer program, in which the moment error applied to the robot body about the roll, pitch and yaw axes may be canceled out with advantage even when the apparatus clears the floor surface, such as during jumping or descending from an elevated place.

DISCLOSURE OF THE INVENTION

In view of the above depicted status of the art, the present invention provides, in its one aspect, a motion controlling apparatus and a motion controlling method for a robot apparatus having at least a plurality of movable parts, in which the motion controlling apparatus comprises ZMP equilibrium equation generating means for generating a ZMP equilibrium equation stating the relationship of equilibrium of moments applied to a robot body of the robot apparatus based on desirable motion data made up by trajectories of respective parts obtained, moment error calculating means for calculating moment errors in the equilibrium equation generated by the ZMP equilibrium equation generating means, priority sequence order setting means for setting the orders of the priority sequence of the parts, the target trajectories of which are to be corrected for canceling out the moment error, and trajectory correction means for correcting the target trajectories of the respective parts in a sequence prescribed by the so set priority sequence, and in which the motion controlling method comprises a ZMP equilibrium equation generating step of generating a ZMP equilibrium equation stating the relationship of equilibrium of moments applied to a robot body of the robot apparatus based on desirable motion data made up by trajectories of respective parts obtained, a moment error calculating step of calculating moment errors in the equilibrium equation generated by the ZMP equilibrium equation generating step, a priority sequence order setting step of setting the orders of the priority sequence of the parts the target (desirable) trajectories of which are to be corrected for canceling out the moment error, and a trajectory correction step of correcting the target (desirable) trajectories of the respective parts in a sequence prescribed by the so set priority sequence.

In particular, in a two-legged mobile robot, the moment about the yaw axis, applied to the robot body, increases appreciably with increase in the walking speed, as pointed out above. This moment about the yaw axis tends to cause turning, slip about the yaw axis relative to the floor surface or falldown of the robot body, ascribable to loss of balance, and thus proves hindrance in realizing stable and accurate legged operations.

With the apparatus and the method for controlling the motion of the robot apparatus, according to the first aspect of the present invention, the moment errors, such as moment about the yaw axis, applied to the robot body on the so set ZMP in carrying out the movement pattern of the robot body, composed of the combination of the movements of the lower limbs, body trunk unit and the upper limbs, may be cancelled out by correcting the target (desirable) trajectories for the respective parts in accordance with a sequence in keeping with the preset priority sequence.

Moreover, according to the present invention, the moment error applied to the robot body about the roll, pitch and yaw axes during movements, such as walking, may be canceled out with advantage by concerted operations of the respective part groups making up the robot body. For example, stability during legged operations, such as walking, may be maintained by the movements of the upper limbs as the legged operations by the lower limbs or by the body trunk are continued.

More specifically, the motion of the upper limbs is the motion exploiting the driving of the shoulder joints or the elbow joints. Although the left and right upper limbs naturally perform anti-phase movements relative to each other, in general, this is not mandatory in carrying out the present invention.

In designing the general two-legged robot body, erected and walking on the two legs, the mobile angle of the shoulder joint or the elbow joint is broader than that of the body trunk unit, such as the body trunk yaw axis. Thus, the yaw axis moment of the robot body may be efficiently and accurately canceled out by such movements of the upper limbs, thus realizing high posture stability.

Additionally, the upper limb movements make the motion of the upper half of the robot body appear more expressive to exhibit what may be said to be performance effects.

In the priority sequence order setting means or step, the priority sequence order for correcting the target (desirable) trajectories may be accorded in the order of the decreasing amount of the movable mass or the decreasing amount of the generatable moment.

Or, in the priority sequence order setting means or step, the priority sequence order for correcting or forming the desired trajectory may be accorded to the respective parts by having reference to the pre-drafted action schedule. For example, in case the robot apparatus is performing legged motion, including the walking first of all, the trajectory of the lower limbs cannot be corrected, and hence a lower order of the priority sequence is accorded to the lower limbs (in case of the priority sequence of correcting the desired trajectory) or a higher order of the priority sequence is accorded to the lower limbs (in case of the priority sequence of not correcting the desired trajectory). Since the trajectory of the hand grabbing an object cannot be corrected, a lower order of the priority sequence or a higher order of the priority sequence is accorded to the hand. In case the robot apparatus is walking sideways on a narrow alley, a lower order of the priority sequence or a higher order of the priority sequence is accorded to the waist part because correction of the trajectory of the waist part tends to cause collision against the wall surface.

The ZMP equilibrium equation generating means or step may derive the ZMP equation for each of the pitch, roll and yaw axes. The trajectory correction means or step may correct the target (desirable) trajectories of the respective parts for each of the pitch, roll and yaw axes to compensate the moment error.

Moreover, there is a problem that, if the robot has cleared the floor, as when the robot has jumped up or when the robot has descended from an elevated place, there is no support polygon, so that, in such case, the conventional technique of controlling the ZMP to be inside the support polygon cannot be applied. In the present invention, the equation of motion, rather than the ZMP equation, needs to be solved in case there is no support acting point with respect to an exterior field or there is no ZMP within the support polygon, such as when the robot body has cleared the floor surface. For this reason, there may further be provided center-of-gravity motion setting means or step for setting the center-of-gravity motion pertinent to the translation and/or rotation of the robot body when both legs of the legged mobile robot have cleared the floor surface.

In such case, it is sufficient that the moment error calculating means calculates the amount of the force compensation at the target center of gravity, in addition to the moment error in the ZMP equilibrium equation, the priority sequence order setting means sets the priority sequence of the parts correcting the target (desirable) trajectory for canceling the amounts of the moment error and the force compensation, and that the trajectory correction means corrects the target trajectories for the respective parts in a sequence which is in keeping with the so set priority sequence.

The present invention also provides, in another aspect, a computer program, stated in a computer-readable form, for allowing operation control for a robot apparatus having at least a plurality of movable parts on a computer system, in which the program comprises a ZMP equilibrium equation generating step of generating a ZMP equilibrium equation stating the relationship of equilibrium of moments applied to a robot body of the robot apparatus based on desirable motion data made up by trajectories of respective parts obtained, a moment error calculating step of calculating moment errors in the equilibrium equation generated by the ZMP equilibrium equation generating step, a priority sequence order setting step of setting the orders of the priority sequence of the parts, the target (desirable) trajectories of which are to be corrected for canceling out the moment error, and a trajectory correction step of correcting the target (desirable) trajectories of the respective parts in a sequence prescribed by the so set priority sequence.

The computer program, in the second aspect of the present invention, is a definition of a computer program stated in a computer readable form for implementing a preset processing on a computer system. Stated differently, the computer program in the second aspect of the present invention may be installed on a computer system, whereby the cooperative action may be displayed on the computer system, such that the operation and effect similar to those of the apparatus and method for controlling the motion of the robot apparatus according to the first aspect of the present invention may be achieved.

Other objects, features and advantages of the present invention will become more apparent from the following detailed description especially when read in conjunction with the accompanying drawings.

BEST MODE FOR CARRYING OUT THE INVENTION

Figure 1:
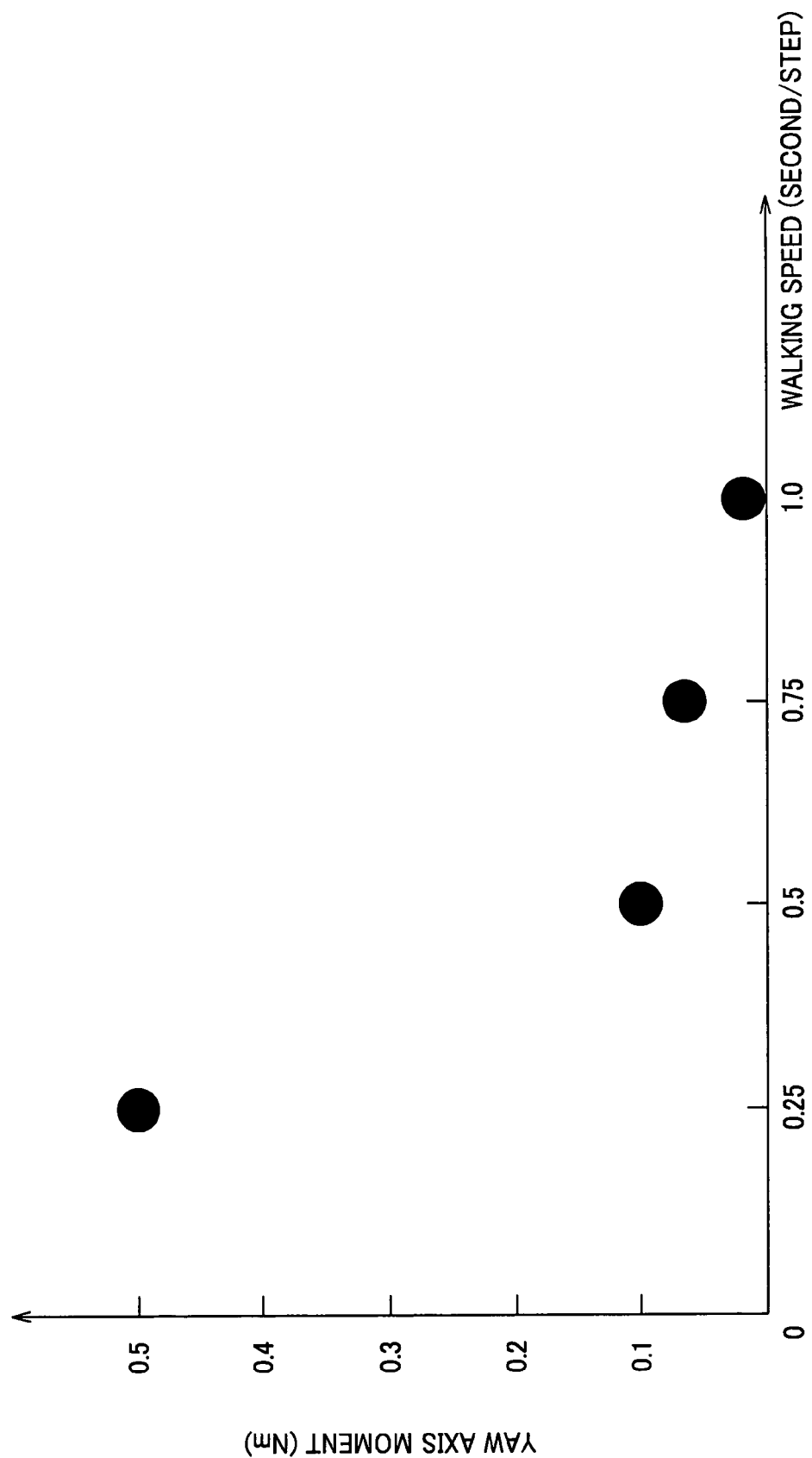
FIG. 1 shows the illustrative relationship between the walking speed of the two-legged walking robot (second/steps) and the moment produced along the yaw axis direction (Nm).

Referring to the drawings, preferred embodiments of the present invention will be explained in detail.

Figure 2:
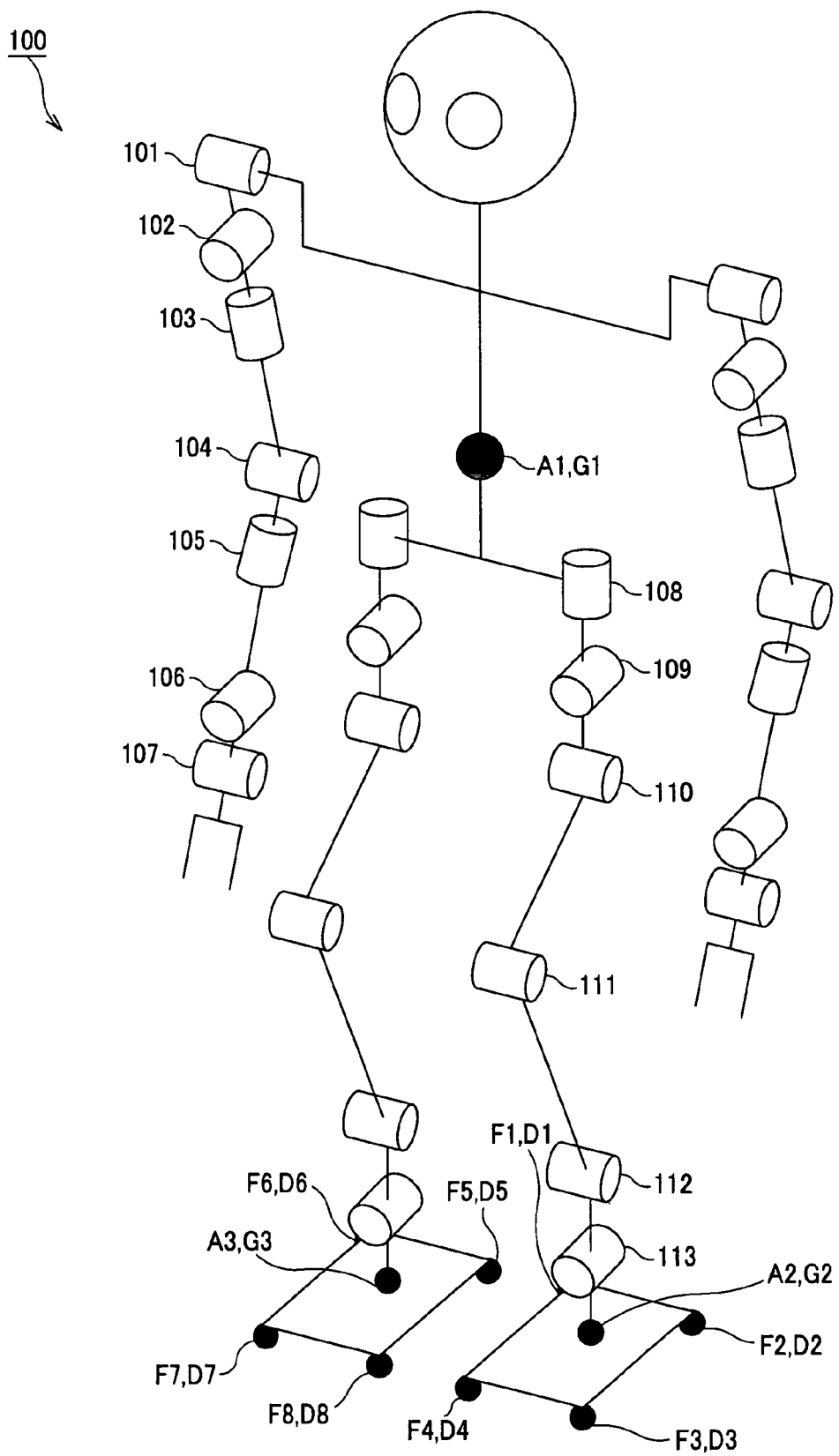
FIG. 2 schematically shows the configuration of the degree-of-freedom of a legged mobile robot 100 embodying the present invention.

FIG. 2 schematically shows the configuration of the degree-of-freedom of the legged mobile robot 100 embodying the present invention.

The legged mobile robot 100, shown in FIG. 2, is a humanoid robot having two legs and two arms. The present legged mobile robot 100 includes the four limbs attached to a robot body, and is made up by left and right arms, having seven degrees of freedom, namely a shoulder joint pitch axis 101, a shoulder joint roll axis 102, an upper arm yaw axis 103, an elbow joint pitch axis 104, a forearm yaw axis 105, a wrist joint roll axis 106 and a wrist joint pitch axis 107, and left and right legs, having six degrees of freedom, namely a hip joint yaw axis 108, a hip joint roll axis 109, a hip joint pitch axis 110, a knee joint pitch axis 111, an ankle joint pitch axis 112 and an ankle joint roll axis 113.

In actuality, these degrees of freedom of the respective joints are implemented by actuator motors. In the present embodiment, a small-sized direct gear coupling AC servo motor of the type in which a servo control system is arranged in one chip and enclosed in a motor unit.

Meanwhile, this sort of the AC servo actuator is disclosed in for example the Japanese Laid-Open Patent Publication 2000-299970, already assigned to the present Applicant (specification of the Japanese Patent Application Number H1-33386).

The legged mobile robot 100 of the present embodiment uses the ZMP as the criterion in verifying the walking stability. According to the criterion of stability verification by ZMP, if a system delimits an appropriate ZMP space and the ZMP exists within a support polygon, no rotational motion or translational motion occurs in the system, such that there is no necessity of solving an equation of motion pertaining to rotation or translation. However, it there is no ZMP within the support polygon or if there exists no support acting point for an exterior field, it is necessary to solve the equation of motion instead of the ZMP equation, as will be explained subsequently.

Figure 3:
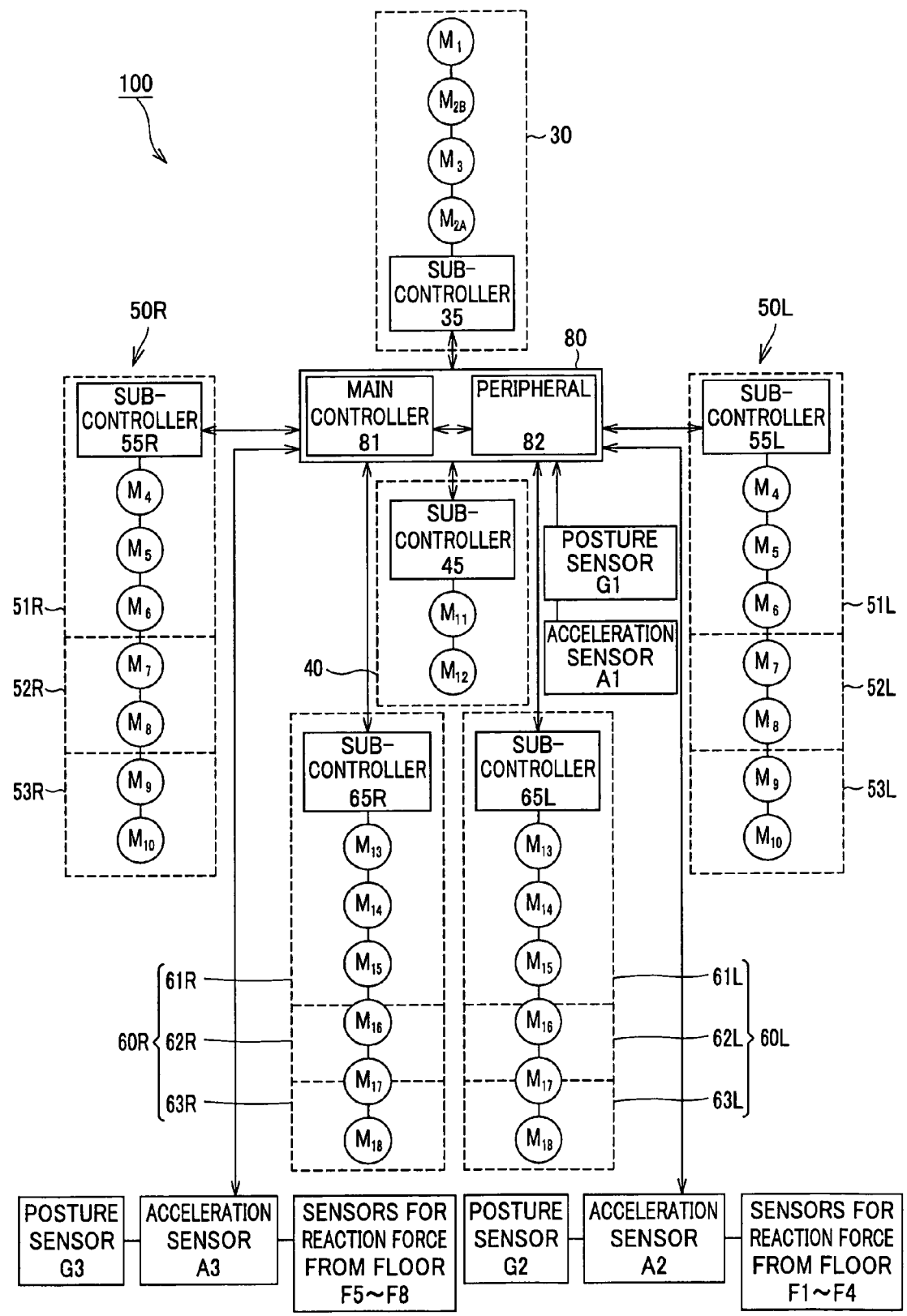
FIG. 3 schematically shows the structure of the control system of the legged-mobile robot 100.

FIG. 3 schematically shows a control system structure of the legged mobile robot 100. As shown in the figure, the legged mobile robot 100 is made up by mechanical units 30, 40, 50R/L and 60R/L, representing four limbs of the human being, and a control unit 80 for performing adaptive control for realization of concerted movements among the respective mechanical units (R and L are suffixes depicting right and left, respectively, hereinafter the same).

The movements of the legged mobile robot 100 in its entirety are comprehensively controlled by the control unit 80. The control unit 80 is made up by a main controller 81, composed of main circuit components, not shown, such as a CPU (central processing unit) and a memory, and a peripheral circuit 82, including an interface responsible for exchanging data or commands with a power supply circuit or respective components of the robot 100.

In the realization of the present invention, there is no particular limitation to the part of mounting the control unit 80. Although the control unit is mounted on a body trunk unit 40, it may also be loaded on a head unit 30. Or, the control unit 80 may be mounted outside the legged mobile robot 100 and communication may be made with the robot body of the legged mobile robot 100 over a wired or wireless path.

The degrees of freedom of respective joints of the legged mobile robot 100, shown in FIG. 2, are implemented by associated actuator motors M. That is, the head unit 30 is provided with a neck joint yaw axis actuator $M_1$, neck joint pitch axis actuators $M_{2A}$, $M_{2B}$, and a neck joint roll axis actuator $M_3$, representing the neck joint yaw axis, first and second neck joint pitch axes, and the neck joint roll axis, respectively.

The body trunk unit 40 includes a body trunk pitch axis actuator $M_{11}$ and a body trunk roll axis actuator $M_{12}$, representing the body trunk pitch axis and the body trunk roll axis, respectively.

The arm units 50R/L, subdivided into upper arm units 51R/L, elbow joint units 52R/L and forearm units 53R/L, are provided with a shoulder pitch axis actuator $M_4$, a shoulder roll axis actuator $M_5$, an upper arm yaw axis actuator $M_6$, an elbow joint pitch axis actuator $M_7$, an elbow joint yaw axis actuator $M_8$, a wrist joint roll axis actuator $M_9$ and a wrist joint pitch axis actuator $M_{10}$, representing a shoulder joint pitch axis 101, a shoulder joint roll axis 102, an upper arm yaw axis 103, an elbow joint pitch axis 104, an elbow joint yaw axis 105, a wrist joint roll axis 106 and a wrist joint pitch axis 107, respectively.

The leg unit 60R/L, sub-divided into a thigh unit 61R/L, a knee unit 62R/L and a shank unit 63R/L, is provided with a hip joint yaw axis actuator $M_{13}$, a hip joint pitch axis actuator $M_{14}$, a hip joint roll axis actuator $M_{15}$, a knee joint pitch axis actuator $M_{16}$, an ankle joint pitch axis actuator $M_{17}$ and an ankle joint roll axis actuator $M_{18}$, representing a hip joint yaw axis 108, a hip joint pitch axis 110, a hip joint roll axis 109, a knee joint pitch axis 111, an ankle joint pitch axis 112 and an ankle joint roll axis 113, respectively.

The actuators $M_1$, $M_2$, $M_3$, . . . , used for the respective joints, may preferably be designed by actuator motors. In the present embodiment, each of these actuators may be the aforementioned small-sized direct gear coupling type AC servo motor in which a servo control system is arranged in one chip and enclosed in a motor unit.

The head unit 30, body trunk unit 40, arm units 50R/L and the leg units 60R/L are each provided with sub-controllers 35, 45, 55R/L and 65R/L for driving controlling the respective actuators.

The body trunk unit 40 of the robot body is provided with a posture sensor G1, comprised e.g. of an acceleration sensor A1 and a gyro sensor. The acceleration sensor A1 is arranged e.g. in each of the X, Y and Z axes. By providing the acceleration sensor A1 to the waist unit of the robot body, it becomes possible to set the waist, as a part having a large movable mass, as a control target point, to directly measure the posture as well as the acceleration at such location to manage ZMP-based posture stabilizing control.

The leg units 60R/L are each provided with floor reaction force sensors F1 to f4 and F5 to F8, acceleration sensors A2 and A3, and posture sensors G2 and G3. The floor reaction force sensors F1 to F8 are formed by mounting pressure sensors on the foot soles to detect whether or not the foot sole has touched the floor based on the presence or absence of the force of reaction from the floor. The acceleration sensors A2 and A3 are provided at least along the directions of the X and y axes. By mounting the acceleration sensors A2 and A3 on the left and right foot soles, it is possible to construct the ZMP equilibrium equation directly at the foot unit closest to the ZMP position.

If the acceleration sensor is provided solely in the waist unit as a part of a large movable mass, solely the waist unit is set as a control target point, so that the state of the foot unit has to be calculated relatively based on the results of calculations of the control target point. Thus, the conditions:
(1) That the floor surface is not moved under any force or torque applied thereto; and
(2) that the frictional coefficient against translational motion on the floor surface is sufficiently large such that no slip is produced need to be met as premises insofar as the foot unit and the floor surface are concerned.

In contrast thereto, according to the present embodiment, a reaction force sensor system, such as a floor reaction force sensor, for directly sensing the force and the ZMP, the local coordinate used for control and the acceleration sensor for directly measuring the local coordinate, are provided in a foot unit, as a part of contact of the robot body with the floor surface. As a result, the ZMP equilibrium equation may be directly formed at the foot unit closest to the ZMP position, so that more severe posture stabilizing control may be implemented with a high speed. Thus, stable walking (movements) of the robot body may be assured even on the gravel or on a thick-piled carpet where the ground surface is moved under application of force or torque or on a tile of a house where a sufficient frictional coefficient against translational motion cannot be provided and hence the slip is likely to be produced.

The main controller (control unit 80) is able to dynamically correct the control target responsive to outputs of the sensors A1 to A3, G1 to G3 and F1 to F8. More specifically, the sub-controllers 35, 45, 55R/L and 65R/L are adaptively controlled to realize the whole-body motion pattern in which the upper limbs, body trunk and the lower limbs of the legged mobile robot 100 are driven in concert.

In the whole-body motion of the robot body of the legged mobile robot 100, the foot unit motion, ZMP trajectory, body trunk motion, upper limb motion and the height of the waist unit, for example, are set, and the commands specifying the movements in meeting with these setting contents are transmitted to the sub-controllers 35, 45, 55R/L and 65R/L. These sub-controllers 35, 45, 55R/L and 65R/L interpret the commands received from the main controller 81 to output driving control signals to the respective actuators $M_1, M_2, M_3, \ldots$ The 'ZMP' herein means a point on the floor surface where the moment by the reactive force form the floor during walking of the robot is zero, and the 'ZMP trajectory' means a trajectory on which the ZMP is moved during the time period of walking of the robot 100.

The sequence of operations for posture stabilization of the legged mobile robot 100 of the present embodiment, during the operations on legs, that is, during execution of the concerted whole body motion pattern of the foot units, waist, body trunk and the lower limbs, is hereinafter explained.

The legged mobile robot 100 of the present embodiment uses the ZMP as the criterion for verifying the walking stability. According to the criterion of stability verification by ZMP, if a system delimits an appropriate ZMP space and the ZMP exists within a support polygon, no rotational motion or translation motion occurs in the system, such that there is no necessity of solving an equation of motion. However, it there is no ZMP within the support polygon or if there exists no support acting point for an exterior field, it is necessary to solve the equation of motion instead of the ZMP equation. For example, if the robot has cleared the floor, as when the robot has jumped up or when the robot has descended from an elevated place, there is no support polygon, so that, in such case, the equation of motion is solved in the present embodiment in place of the ZMP equation, as later explained.

The ZMP equation of the robot body states the relationship of equilibrium of the respective moments on the target ZMP. The ZMP equilibrium equation is such an equation which, in case a robot body is depicted by plural mass points $m_i$ as control target points, finds the trajectory of each control point for which the sum of the moments on the target ZMP generated in the totality of the control target points $m_i$ is zero.

The ZMP equilibrium equation (1) of the robot body, stated with the world coordinate system (O-XYZ), and the ZMP equilibrium equation (2) of the robot body, stated with the local coordinate system of the robot body (O-X'Y'Z'), follow:

$$\begin{cases} \sum_i^{all\text{-}particles} m_i(r_i - P_{zmp}) \times \ddot{r}_i + T - \sum_j M_j - \sum_k (S_k - P_{zmp}) \times F_k = 0 \\ r = r' + Q \end{cases} \quad (1)$$

$$\begin{cases} \sum_i^{all\text{-}particles} m_i(\bar{r}_i - \bar{P}_{zmp}) \times (\ddot{\bar{r}}_i + \ddot{Q}) + T - \sum_j M_j - \\ \qquad\qquad\qquad\qquad\qquad\qquad \sum_k (\bar{S}_k - \bar{P}_{zmp}) \times F_k = 0 \\ \sum_i^{all\text{-}particles} m_i \bar{r}_i \times (\ddot{\bar{r}}_i + \ddot{Q}) + T - \sum_i^{all\text{-}particles} m_i \bar{P}_{zmp} \times (\ddot{\bar{r}}_i + \ddot{Q}) + T - \\ \qquad\qquad\qquad\qquad \sum_j M_j - \sum_k (\bar{S}_k - \bar{P}_{zmp}) \times F_k = 0 \\ \ddot{r} = \ddot{\bar{r}} + \ddot{Q} \end{cases} \quad (2)$$

The above equations state that the sum of the moments about the ZMP (radius $r_i - P_{zmp}$) generated by the acceleration component applied to each mass point (or control target point) $m_i$, the sum of the j'th external force moments $M_j$ applied and the sum of the moments about the ZMP generated by the external force $F_k$, with the point of action of the k'th external force $F_k$ being $S_k$, are in equilibrium with one another.

The ZMP equilibrium equations include the floor reaction force moment T at the target ZMP (moment error component). The posture stability of the robot body may be maintained by suppressing this moment error to zero or to within a preset allowable range. Stated differently, the essence of the posture stabilization control, with the ZMP as the criterion of verifying the stability, is to correct the robot body motion, such as foot unit motion, or the trajectories of the respective parts of the upper body portion, so that the moment error will be zero or not larger than the allowable value.

In the present embodiment, since the acceleration sensors are provided on the foot soles of the foot units, as the contact part with the floor surface, it is possible to set the local coordinate system of the actual robot with respect to the world coordinate system, to find the foot sole of the foot unit as the point of origin and to directly derive the ZMP equilibrium equation. By providing the acceleration sensors to the control target points, having large movable mass, including the waist unit first of all, the amounts of the moments about the ZMP for each control target point may be directly derived using the output values of the acceleration sensors.

Since the actual robot as the control target is a mobile system, it is difficult to find the position vector on the world coordinate at each control target point. As an alternative method, the position vector of the control target point on the local coordinate system may be found rather easily by inverse kinematic calculations. Hence, the latter ZMP equilibrium equation, stated with the local coordinate system of the robot body (O-X'Y'Z'), may be used to carry out the actual posture stabilization processing. It should be noted that, since it is difficult with the state sensors loaded on the robot to correctly measure the ZMP trajectory with the world coordinate system, an exterior measurement unit, fixed to the world coordinate system, is required in general, such that the action of the robot body by itself, such as walking, becomes impossible. On the other hand, if a load sensor is provided on the floor contact portion to measure the ZMP trajectory, it is possible to obtain the ZMP trajectory with the local coordinate correctly and directly. Moreover, by providing the acceleration sensor in the vicinity of the point of origin of the local coordinate system, the information which becomes dominant in the high speed motion can be measured directly. For this reason, the ZMP equilibrium equation in the local coordinate system is used in the present embodiment.

The posture stabilizing operations in the legged mobile robot 100 of the present embodiment, that is, the sequence of operations in generating the concerted whole-body motion pattern which cancels out the moments generated by the movements of the waist unit, body trunk and the lower limbs, is hereinafter explained. The present embodiment is featured, first of all, by dividing the robot body of the legged mobile robot 100 into plural parts, according the order in the priority sequence of trajectory correction to each part, and by correcting the target (desired) trajectory from one part to another to cancel out the moment error.

Figure 4:
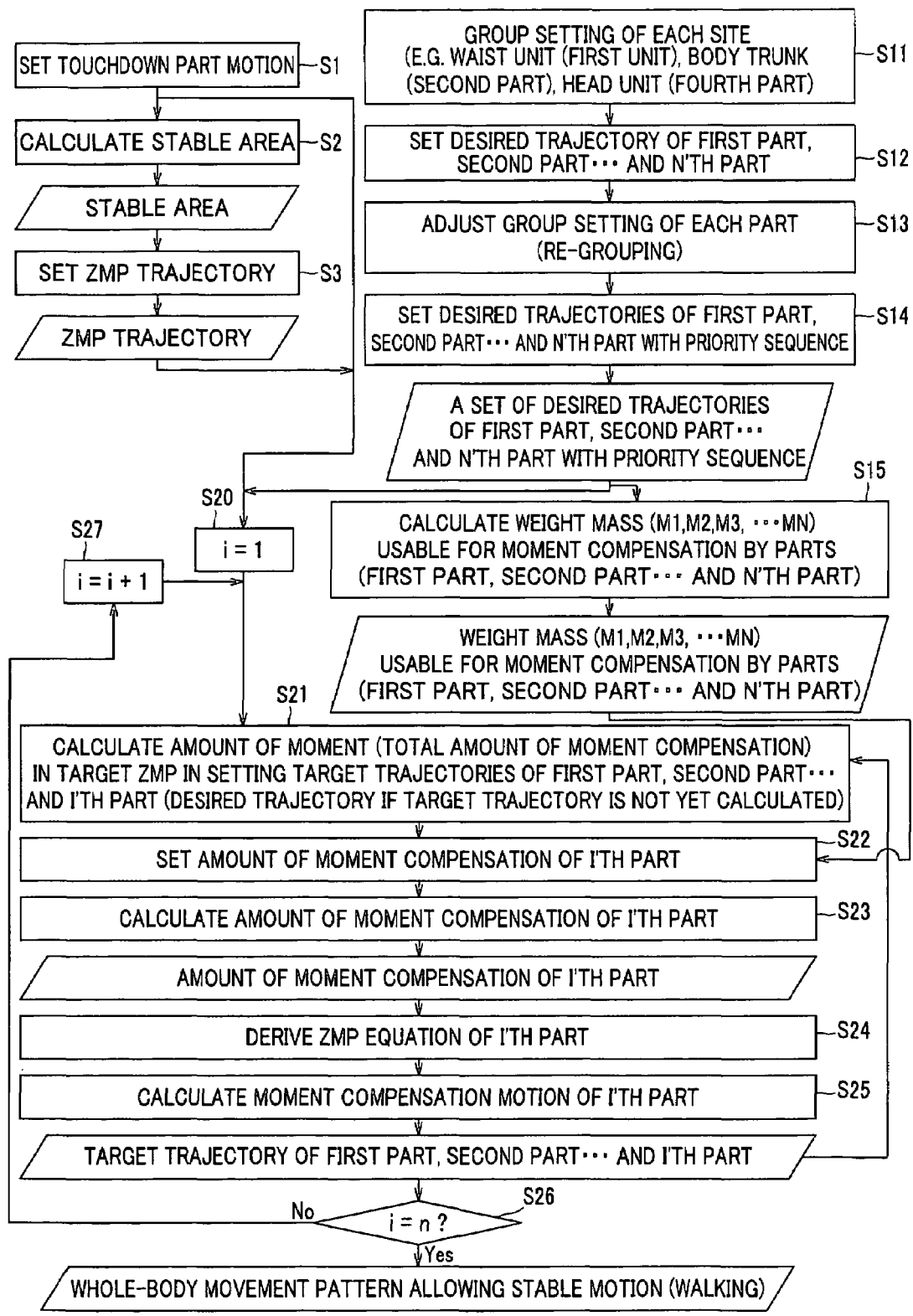
FIG. 4 is a flowchart showing an example of an operational sequence for stabilizing processing of a whole-body exercise pattern of the robot body.

FIG. 4 depicts a flowchart showing an illustrative sequence of operations for stabilizing the whole-body motion pattern of the robot body.

First, the movements of the floor contact parts, such as foot units, are set (step S1). The foot unit movements are motion data chronologically interconnecting two or more poses of the robot body. The motion data are data formulated and edited in advance, using e.g. a motion editing system, and is made up by the joint space information, representing the displacement of respective joint angles of the foot units, and the Cartesian space information representing the joint positions.

The ZMP stable area is then calculated, based on the motion in the floor contact part, as set, such as the foot unit (step S2). Or, the ZMP stable area is calculated, based on the desired trajectories, provided with the orders of the priority sequence as set from one part group to another (step S14 as later explained). Meanwhile, if the point of contact of the robot with the floor surface is not the foot sole, as when the robot performs floor exercise or handstand, the ZMP stable area is calculated, based on the support polygon as defined by the floor contact point other than the foot sole and the floor surface.

The ZMP is a point about which the moments applied to the robot body are equal to zero, as discussed above. Basically, the ZMP is inside a support polygon defined by the floor contact points of the foot soles and the floor surface. The ZMP stable area is set inside this support polygon. The robot body may be in a highly stabilized state by having the ZMP accommodated in this ZMP stable area.

The ZMP trajectory during the foot unit motion is set, based on the foot unit motion and the ZMP stable area (step S3). Meanwhile, if the point of contact of the robot with the floor surface is not the foot sole, as when the robot performs floor exercise or handstand, the ZMP trajectory is calculated, based on the support polygon as defined by the floor contact point other than the foot sole and the floor surface.

The respective parts of the robot body are grouped, such as waist unit, body trunk, upper limbs and head unit (step S11).

Figure 5:
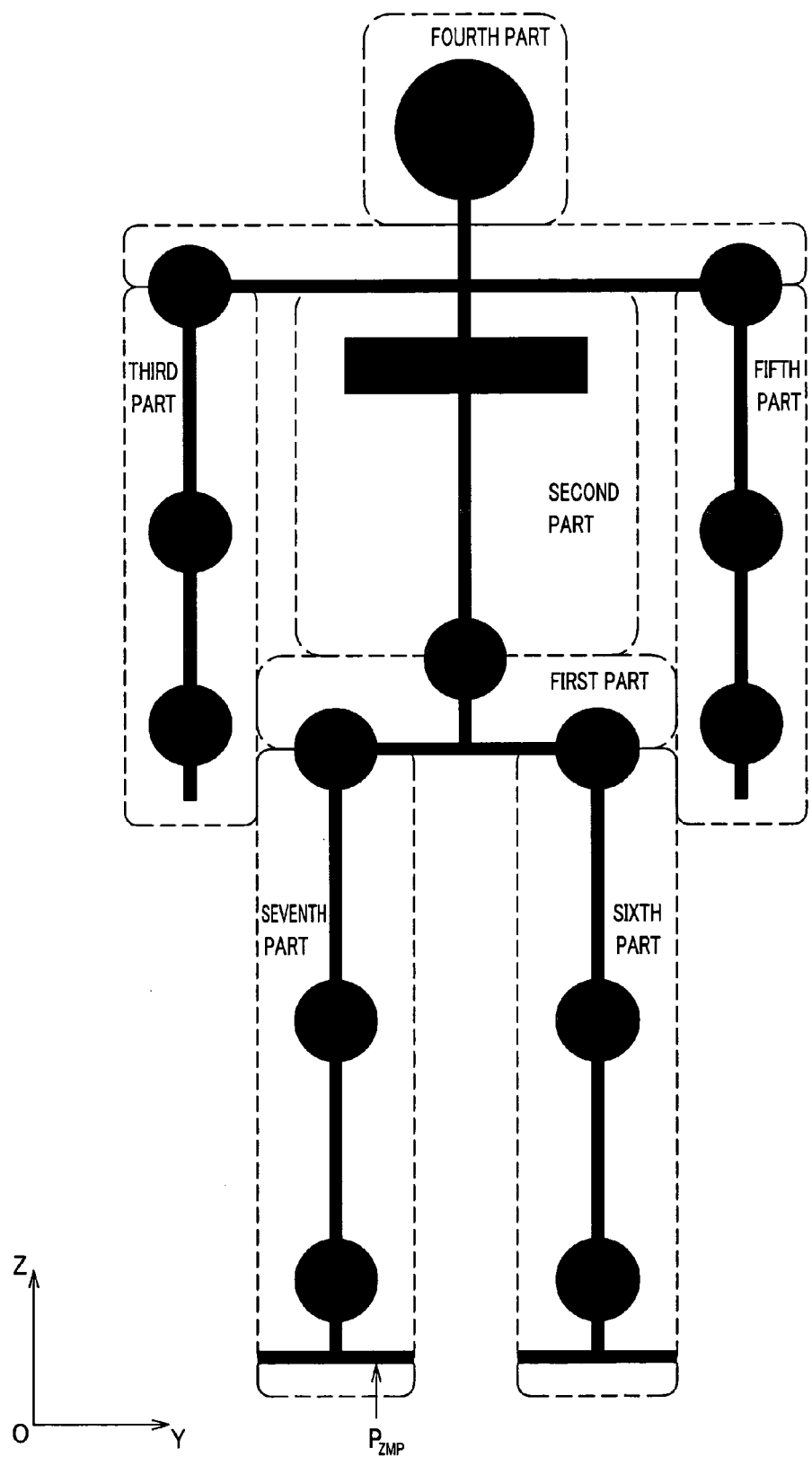
FIG. 5 schematically shows an example of setting part groups of the robot body.

FIG. 5 shows an example of setting of the part groups of the robot body. In the example shown in FIG. 5, first to seventh part groups, namely a waist unit, a body trunk, a right arm unit, a head unit, a left arm unit, a left leg unit and a right leg unit, are set. Each part group is made up by plural mass points. These mass points may be set manually by an implementer or automatically in accordance with a preset rule (for example, locations with large movable mass are set as mass points). If the number of the mass points of an i'th part is $n_i$, the total weight mass $m_i$ of the i'th part group (i'th unit) is given by the following equation (3):

$$m_i = \sum_{i}^{n_i} m_i \qquad (3)$$

A desired trajectory is set from one part group to another (step S12). The desired trajectory for each part group of the robot body is set off-line, with the aid of, for example, a motion editing system.

The group setting of each part is then adjusted by way of re-grouping (step S13). The order of the priority sequence is accorded to each of the part groups (step S14). The order of the priority sequence here means the order used in processing calculations for posture stabilizing control of the robot body and is determined depending on amount of the movable mass or amount of the generatable moment. The result is that a set of desired trajectories, provided with the order of the priority sequence, are completed for the respective parts of the robot body. At this time, the conditions for connection of the respective parts, such as local coordinate connection, position-fixed connection to the world coordinate of the specified part or the world coordinate posture connection of the specified parts, are also set. The priority sequence may also be varied at time t.

The order in the priority sequence for each part is determined by referencing a pre-drafted action schedule, in addition to amount of the movable mass or amount of the generatable moment. For example, when the robot is performing legged movements, including the walking, first of all, the lower order in the priority sequence is accorded to the foot unit, contacting the floor, because the trajectory of the foot unit contacting the floor cannot be corrected. The trajectory of a hand for grabbing an article cannot be corrected, and hence a lower order in the priority sequence is accorded to the hand. When the robot is walking on a narrow alley sideways, a lower order in the priority sequence is accorded to the waist unit, because the waist unit is likely to impinge on a wall if the trajectory of the waist unit is changed.

Moreover, for each part group of the robot body, the weight mass that may be used for moment compensation is calculated (step S15). In an instance of FIG. 5, since the right leg is a support leg and the ZMP position $P_{ZMP}$ is present on the right leg, the weight mass that may be used for moment compensation in each part group is as shown in the following equation (4):

$$\begin{cases} M_1 = \sum_{m=1}^{5} m_m \\ M_2 = \sum_{m=2}^{5} m_m \\ M_3 = m_3 \\ M_4 = m_4 \\ M_5 = m_5 \\ M_6 = m_6 \\ M_7 = \sum_{m=1}^{7} m_m \end{cases} \quad (4)$$

Figure 6:
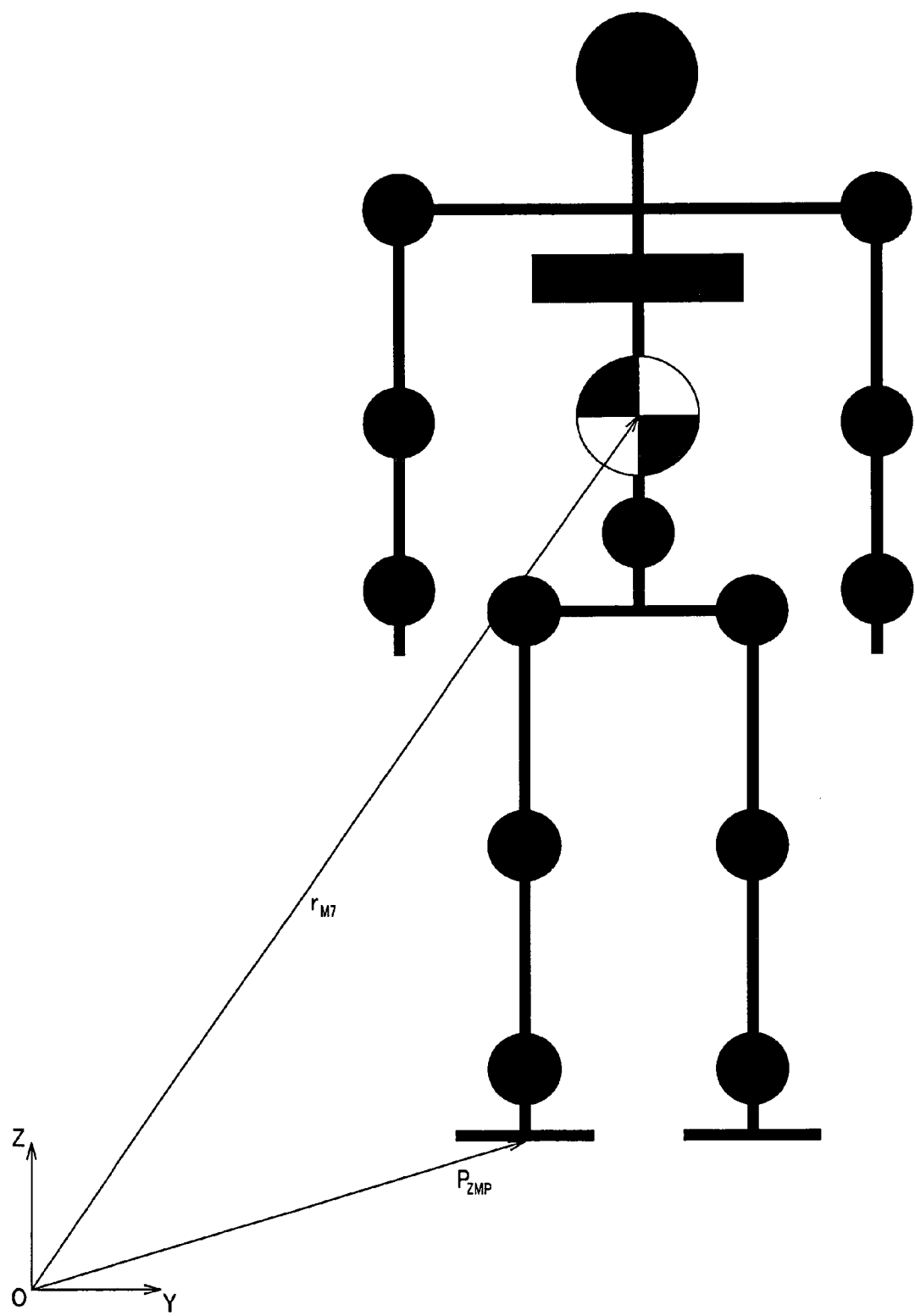
FIG. 6 shows the position of the center of gravity of a mass M7.

With the first unit, that is the waist unit, the body trunk unit, right arm unit, head unit and the left arm unit, supported by the waist unit, may be used, in addition to the waist unit itself, for moment compensation. With the second unit, that is, the body trunk unit, the right arm unit, head unit and the left arm unit, supported by the body trunk unit, may be used, in addition to the body trunk unit itself, for moment compensation. With the third to sixth units, that is, the right arm unit, head unit, left arm unit and the left leg unit, as a foot unit in flight, there are no part groups supported by these units, so that only the own units represent the weight masses that may be used for moment compensation. With the seventh unit, that is, the right leg unit, as a leg in stance, supporting the totality of the part groups, the sum $M_7$ of the weight masses of all parts of the robot body may be used for moment compensation. The center of gravity position of the weight mass $M_7$ in this case corresponds to the center of gravity position of the robot body, rather than to that of the leg unit (see FIG. 6).

Based on the motion of the floor contact parts, such as the foot unit, the ZMP trajectory and the set of the desired trajectories of each of the part groups of the robot body, the motion patterns of the respective part groups are put into the posture stabilizing processing.

In this posture stabilizing processing, an initial value of 1 is substituted for a processing variable i (step S20). Then, the amount of the moment on the target ZMP, that is, the total amount of the moment compensation $\Omega$ in case a target trajectory is set in each part group, is calculated (step S21), as shown in the following equation (5):

$$\Omega = \sum_{i}^{\text{all\_particles}} m_i(r_i - P_{zmp}) \times \ddot{r}_i - \sum_{j} M_j - \sum_{k}(S_k - P_{zmp}) \times F_k \quad (5)$$

It should be noted that the total amount of the moment compensation $\Omega$ is the sum of the amounts of the moment on the target ZMP of each part group plus the moment of the unknown external force and the unknown external force, defined in the above equations, as known terms.

For the part where the target trajectory has not been calculated, a desired trajectory is used.

Then, using the weight mass $M_i$, that may be used for moment compensation of the part i in question, calculated in the step S15, an absolute moment compensation coefficient $\alpha_i$ thereof is set (step S22) and the amount of the moment compensation $\Omega_i$ in the part group i is calculated (step S23), as shown in the following equation (6):

$$\begin{cases} \Omega_i = \dfrac{\alpha_i}{\sum_{i}^{n} \alpha_i} \Omega \\ \alpha_i = \beta_i \times \dfrac{M_i}{\sum_{i=1}^{n} M_i}, \\ \text{in which, } \sum_{i=1}^{n} \alpha_i = 1.0, \\ \beta_i \text{: amount of relative moment compensation} \end{cases} \quad (6)$$

Then, using the amount of the moment compensation $\Omega_i$ of the i'th part, as calculated, the ZMP equation pertinent to the i'th part is derived (step S24), as indicated by the following equation (7):

sum of mass points that may be used by the i'th     (7)
site for moment compensation $$\sum_{i} m_i(\Delta r_i - P_{zmp}) \times \Delta \ddot{r}_i + \Omega_i = 0$$

However, with the above ZMP equation, containing many unknown variables, it is difficult to find a solution by analytical routes or by numerical calculations. Thus, an approximate ZMP equation, indicated by the following equation (8):

$$M_i(\Delta r_{M_i} - P_{zmp}) \times \Delta \ddot{r}_{M_i} + \Omega_i = 0 \quad (8)$$

is here derived, in which the target center-of-gravity trajectory $r_{M_i}$ of the weight mass usable for the moment compensation of the i'th part, is a known variable, and in which an amount of change $\Delta r_{M_i}$ to the target center-of-gravity trajectory of the weight mass usable for moment compensation of the i'th part is an unknown variable. In the above equation, $r_{M_i}$ is the position vector of the center of gravity of the weight mass $M_i$ usable for moment compensation in the i'th part group.

This approximate ZMP equation is first solved to calculate the amount of change $\Delta r_{M_i}$ with respect to the target center-of-gravity trajectory of the weight mass usable for moment compensation of the i'th part. The target center-of-gravity trajectory of the weight mass usable for moment compensation of the i'th part is calculated by the following equation (9):

$$r_{i_{M_i}} = \Delta r_{M_i} + r_{M_i}. \quad (9)$$

In the case of the legged mobile robot, the links of which are interconnected by rotational joints, the equation (8) in general co-owns movements in the Z-direction and hence becomes a non-linear two order differential equation presenting the interference and which is difficult to solve analytically. Thus, the following equation (10):

$$r_{i_{M_{iz}}} = \text{constant value}, \Delta \ddot{r}_{M_{iz}} = 0 \quad (10)$$

not co-owning the movements in the Z-direction is used to render the equation linear and free of interference.

An approximate solution of the target center-of-gravity trajectory of the weight mass usable for moment compensation of the i'th part is calculated, an amount of change $\Delta r_i$ of each mass point $r_i$ of the i'th part, that may be calculated from this approximate solution, is substituted into the equation (7) as the strict ZMP equation to find a moment error. This error with the sign inverted is accumulated in the right side of the equation (8) rendered linear and free of interference, and an approximate solution is again found. This sequence of operations is repeated until the error is not larger than a preset allowable value to calculate the moment compensating motion of the part in question (step S25). In this manner, the target trajectory for each of the parts having the first to i'th order in the priority sequence.

For calculating the trajectories of the respective mass points of the i'th part from the approximate solution of the target center-of-gravity trajectory of the weight mass usable for moment compensation of the i'th part, an operating point is placed in an i'th optional part, and a center-of-gravity vector C (X, Y, Z, $\theta_x$, $\theta_y$, $\theta_z$), having the translational positions (X, Y, Z) or the rotational angles ($\theta_x$, $\theta_y$, $\theta_z$) as unknown variable, is derived. An equation C (X, Y, Z, $\theta_x$, $\theta_y$, $\theta_z$)=$r_{iMi}$, in which the center-of-gravity vector C (X, Y, Z, $\theta_x$, $\theta_y$, $\theta_z$) is arranged as an unknown variable on the left side and in which the center-of-gravity position vector $r_{Mi}$ of the weight mass $M_i$ is arranged as a known variable on the right side, is derived, and the solution of this equation is calculated by a numerical value search method or found analytically.

This processing is carried out for all part groups to generate a whole-body motion pattern capable of performing stable movements, e.g. walking.

With the processing sequence, shown in FIG. 4, the robot body of the legged mobile robot 100 is imaginarily divided into plural parts, the order of the priority sequence for trajectory correction is accorded to each part and the target (desired) trajectory is corrected from one part to another to cancel out the moment error in the whole-body concerted motion. It should be noted that the posture stabilizing processing employing the ZMP as the criterion for verifying the stability basically resides in searching a point of zero pitch axis moment and zero roll axis moment within a support polygon defined by the floor contact point, such as the foot sole, and the floor surface. However, there is a problem that the moment error about the yaw axis, that is, about the Z-axis, of the robot body is not explicitly coped with.

Figure 7:
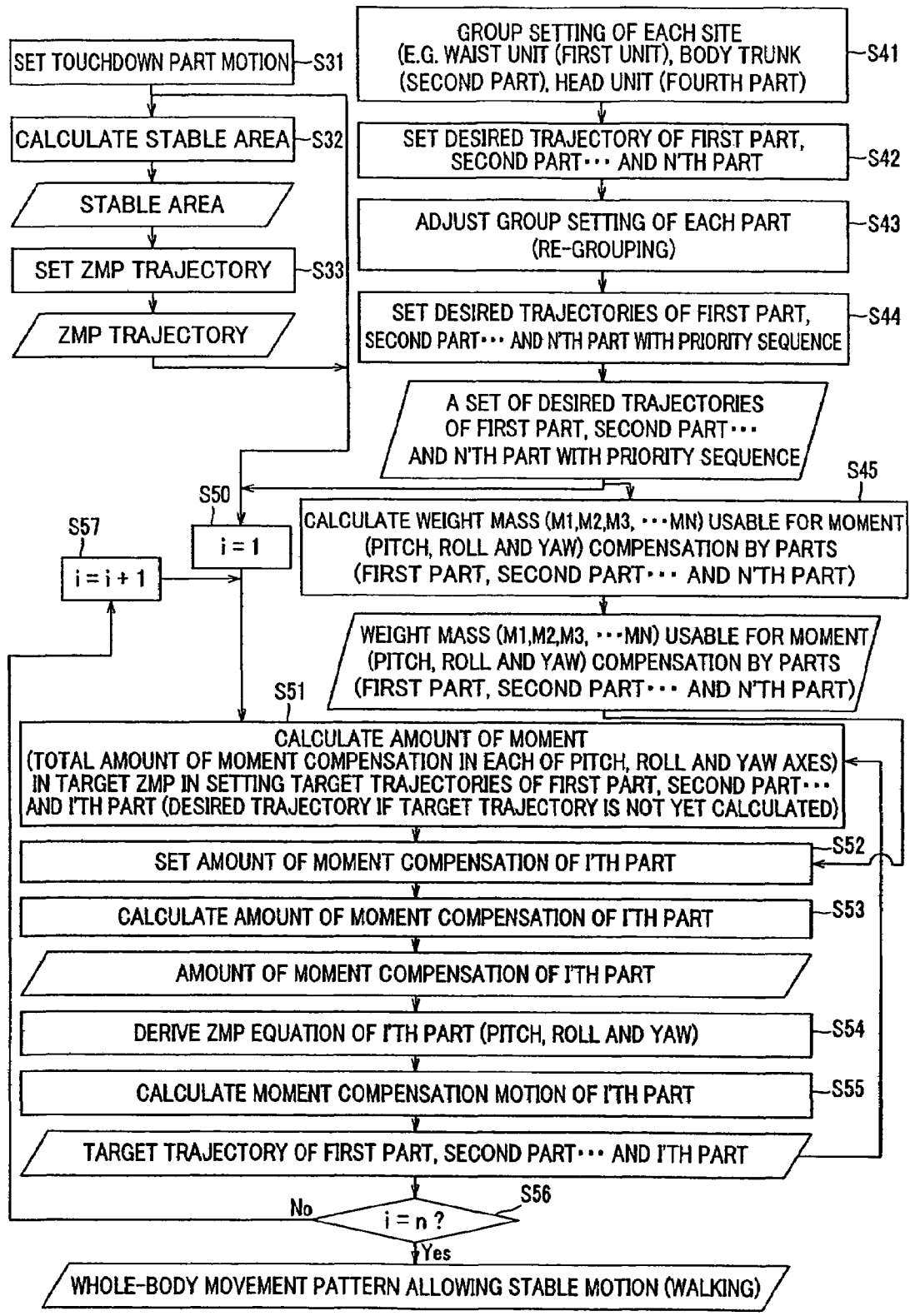
FIG. 7 is a flowchart showing another example of the operational sequence for stabilizing processing of a whole-body exercise pattern of the robot body.

In a modification of the above-described embodiment, the moment errors applied to the robot body about the roll, pitch and yaw axes in the whole body concerted movement, such as walking, are canceled out. FIG. 7 shows, in a flowchart, the processing sequence for canceling out the moment errors about the roll, pitch and yaw axes of the robot body to stabilize the whole-body motion pattern.

First, the motion of the foot unit is set (step S31). The motion of the foot unit is motion data made up by chronologically interconnected two or more poses of the robot body. The motion data is made up by the joint space information representing the displacement of the respective joint angles of the foot unit and the Cartesian space information representing the joint positions (same step).

The ZMP stable area is then calculated, based on the movements in the floor contact parts, as set, such as the foot unit (step S32). Or, the ZMP stable area is calculated, based on the desired trajectory, provided with the priority sequence, as set from one part group to another (step s44 as later explained). Meanwhile, if the contact point of the robot with the floor surface is not the foot unit, as when the robot is performing floor exercise or a handstand, the ZMP stable area is calculated based on the support polygon defined by the floor contact point other than the foot unit and the floor surface.

The ZMP is a point where the moment applied to the robot body becomes zero, as discussed previously. Basically, the ZMP is in the inside of a support polygon defined by the floor contact point of the foot sole and the floor surface. The ZMP stable area is set inwardly of this support polygon. With the ZMP in this area, the robot body can be maintained in a highly stabilized state.

Based on the motion of the foot unit and the ZMP stable area, the ZMP trajectory during the motion of the foot unit is set (step S33). However, if the contact point of the robot with the floor surface is not the foot unit, as when the robot is performing floor exercise or a handstand, the ZMP trajectory is set based on the support polygon defined by the floor contact point other than the foot unit and the floor surface.

The respective parts of the robot body are set into groups, such as into a waist unit, a body trunk unit, upper limbs and a head unit. An instance of part group setting of the robot body is shown in FIG. 5, where the first to seventh part groups are set in the sequence of the waist unit, body trunk unit, right arm unit, head unit, left arm unit, left leg unit and the right leg unit.

A desired trajectory is set for each part group (step S42). The desired trajectory for each part group of the robot body is set off-line, using e.g. a motion editing system.

The group setting of the respective parts is adjusted, by way of regrouping (step S43) and the order of the priority sequence is accorded to each group (step S44). The priority sequence is the order by which the parts carrying the order are put into the processing calculations for posture stabilizing control of the robot body, and is accorded in dependence upon the amount of the movable mass or the amount of the generatable moment. As a result, a set of desired trajectories provided with the orders of the priority sequence is formed for each part of the robot body. The order of the priority sequence is $\rho$ and is made up by three elements, namely a pitch axis priority sequence $\rho_p$, roll axis priority sequence $\rho_r$ and a yaw axis priority sequence $\rho_{yaw}$. Moreover, the priority sequence of each part is determined by referencing a pre-drafted action schedule, in addition to amount of the movable mass or amount of the generatable moment. At this time, the conditions for connection of the respective parts, such as local coordinate connection, position-fixed connection to the world coordinate of the specified part or the posture connection to the world coordinate of the specified parts, are also set. The priority sequence may also be varied at time t.

The weight mass usable for moment compensation is calculated from one part group of the robot body to another (step S45). In the instance shown in FIG. 5, since the right leg is the leg in stance and the ZMP position $P_{ZMP}$ is on the right leg unit, the weight mass Mi usable for moment compensation in each part group is as described above.

Based on the motion of the floor contact parts, such as the foot units, the ZMP trajectory and the set of the desired trajectories of each of the part groups of the robot body, the motion patterns of the respective part groups are put into the posture stabilizing processing, in accordance with the priority sequence as set in the step S44.

In this posture stabilizing processing, an initial value of 1 is substituted in a processing variable i (step S50). Then, the amount of the moment on the target ZMP, that is, the total amount of the moment compensation $\Omega$ in case a target trajectory is set in each of the totality of the part groups, is calculated (step S51), as shown in the following equation (11):

$$\Omega = \sum_{i}^{all\_particles} m_i(r_i - P_{zmp}) \times \ddot{r}_i - \sum_{j} M_j - \sum_{k} (S_k - P_{zmp}) \times F_k. \quad (11)$$

It should be noted that the total amount of the moment compensation $\Omega$ is the sum of the amounts of the moment on the target ZMP of the totality of the part groups plus the moment of the unknown external force and the unknown external force, defined in the above equations, as known terms.

For the part where the target trajectory has not been calculated, a desired trajectory is used.

Then, using the weight mass $M_i$, that may be used for moment compensation of the part i in question, calculated in the step S45, an absolute moment compensation coefficient $\alpha_i$ thereof is set (step S52) and the amount of the moment compensation $\Omega_i$ in the part group i is calculated (step S53), as shown in the following equation (12):

$$\begin{cases} \Omega_i = \dfrac{\alpha_i}{\sum\limits_{i}^{n} \alpha_i} \Omega \\ \alpha_i = \beta_i \times \dfrac{M_i}{\sum\limits_{i=1}^{n} M_i}, \\ \text{in which, } \sum\limits_{i=1}^{n} \alpha_i = 1.0, \\ \beta_i: \text{amount of relative moment compensation} \end{cases} \quad (12)$$

Then, using the amount of the moment compensation $\Omega_i$ of the i'th part, as calculated, the ZMP equation pertinent to the i'th part is derived (step S54), as indicated by the following equation (13):

$$\sum_{i}^{\text{sum of mass points that may be used by the i'th site for moment compensation}} m_i(\Delta r_i - P_{zmp}) \times \Delta \ddot{r}_i + \Omega_i = 0 \quad (13)$$

However, with the above ZMP equation, containing many unknown variables, it is difficult to find a solution by analytical routes or by numerical calculations. Thus, an approximate ZMP equation, indicated by the following equation (14):

$$M_i(\Delta r_{M_i} - P_{zmp}) \times \Delta \ddot{r}_{M_i} + \Omega_i = 0 \quad (14)$$

is here derived, in which the target center-of-gravity trajectory $r_{M_i}$ of the weight mass usable for the moment compensation of the i'th part, is a known variable, and in which an amount of change $\Delta r_{M_i}$ to the target center-of-gravity trajectory of the weight mass usable for moment compensation of the i'th part is an unknown variable. In the above equation, $r_{M_i}$ is the position vector of the center of gravity of the weight mass $M_i$ usable for moment compensation in the i'th part group.

This approximate ZMP equation is first solved to calculate the amount of change $\Delta r_{M_i}$ of the weight mass usable for moment compensation of the i'th part with respect to the target center-of-gravity trajectory. The target center-of-gravity trajectory of the weight mass usable for moment compensation of the i'th part is calculated by the following equation (15):

$$r_{i_{M_i}} = \Delta r_{M_i} + r_{M_i} \quad (15)$$

In the case of the legged mobile robot, the links of which are interconnected by rotational joints, the equation (14) in general co-owns movements in the Z-direction and hence becomes a non-linear two order differential equation presenting the interference and which is difficult to solve analytically. Thus, the following equation (16):

$$r_{i_{M_{iz}}} = \text{constant value}, \Delta \ddot{r}_{M_{iz}} = 0 \quad (16)$$

not co-owning the motion in the Z-direction is used to render the equation linear and free of interference.

An approximate solution of the target center-of-gravity trajectory of the weight mass usable for moment compensation of the i'th part is calculated, an amount of change $\Delta r_i$ of each mass point $r_i$ of the i'th part, that may be calculated from this approximate solution, is substituted in the equation (13), as the strict ZMP, to find a moment error. This error with the sign inverted is accumulated in the right side of the equation (14), rendered linear and free of interference, and an approximate solution is again found. This sequence of operations is repeated until the error is not larger than a preset allowable value to calculate the moment compensating movement of the part in question (step S55). In this manner, the target trajectory may be obtained for each of the parts having the first to i'th orders in the priority sequence.

For calculating the trajectories of the respective mass points of the i'th part from the approximate solution of the target center-of-gravity trajectory of the weight mass usable for moment compensation of the i'th part, an operating point is placed in an i'th optional part, and a center-of-gravity vector C (X, Y, Z, $\theta_x$, $\theta_y$, $\theta_z$), having the translational positions (X, Y, Z) or the rotational angles ($\theta_x$, $\theta_y$, $\theta_z$) as unknown variables, is derived. An equation C (X, Y, Z, $\theta_x$, $\theta_y$, $\theta_z$)=$r_{iM_i}$, in which the center-of-gravity vector C (X, Y, Z, $\theta_x$, $\theta_y$, $\theta_z$) is arranged as an unknown variable on the left side and in which the center-of-gravity position vector $r_{M_i}$ of the weight mass $M_i$ is arranged as a known variable on the right side, is derived, and the solution of this equation is calculated by a numerical value search method or found analytically.

There are occasions where the movements satisfying the priority sequence $\rho$ ($\rho_p$, $\rho_r$, $\rho_{yaw}$) do not exist, depending on the configuration of the degree of freedom of the i'th part, as when the interference with respect to the pitch or roll motion is small or when there is no degree of freedom of the yaw-axis motion. In such case, the processing reverts to the step S44 to re-set the priority sequence.

This processing is carried out for all part groups to generate a whole-body motion pattern capable of performing stable movements, e.g. walking.

With the processing sequence, shown in FIG. 7, the robot body of the legged mobile robot 100 is imaginarily divided into plural parts, the order of the priority sequence for trajectory correction is accorded to each part and the whole-body motion pattern may be stabilized in such a manner as to cancel out the moment error applied to the robot body about the roll, pitch and yaw axes. The posture stabilizing control of the robot, employing the ZMP as the criterion for verifying the stability, searches a point of the zero pitch axis moment and the zero roll axis moment in the inside of the support polygon defined by the floor contact point of the foot sole and the floor surface. However, there is a problem that, if the robot has cleared the floor, as when the robot has jumped up or when the robot has descended from an elevated location, there is no support polygon, so that, in such case, the conventional technique of controlling the ZMP to be inside the support polygon cannot be applied.

Figure 8:
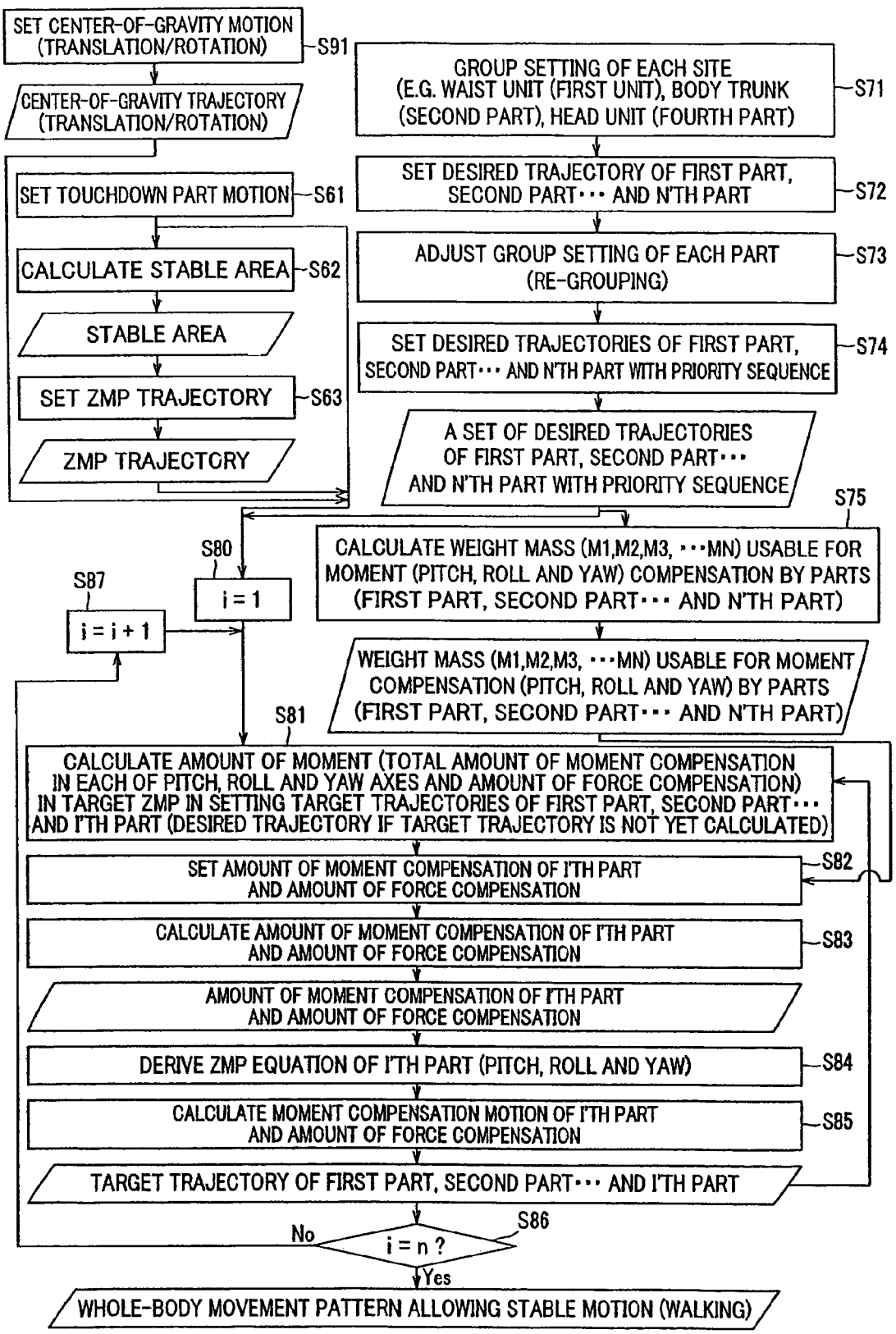
FIG. 8 is a flowchart showing a further example of the operational sequence for stabilizing processing of a whole-body exercise pattern of the robot body.

Thus, as a modification of the present embodiment, it is assumed that there is no ZMP within the support polygon, as when the foot unit of the robot clears the floor, or when there is no support point for the outside. FIG. 8 shows, as a flowchart, a further sequence of operations for stabilizing processing of the whole-body motion pattern of the robot body. In the processing sequence, shown in FIG. 8, it is assumed that there is no ZMP within the support polygon, as when the foot unit of the robot has cleared the floor or when there is no support point for the outside field, and an equation of motion is solved in addition to the ZMP equation.

First, the motion of the foot unit is set (step S61). The foot unit movements are motion data chronologically interconnecting two or more poses of the robot body. The motion data is made up by the joint space information, representing the displacement of respective joint angles of the foot units, and the Cartesian space information representing the joint positions (step S61).

The ZMP stable area is then calculated, based on the motion in the floor contact part, as set, such as the foot unit (step S62). Or, the ZMP stable area is calculated, based on the desired trajectory, provided with the order of the priority sequence so set from one part group to another (step S74 as later explained). Meanwhile, if the point of contact of the robot with the floor surface is not the foot sole, as when the robot performs floor exercise or handstand, the ZMP stable area is calculated, based on the support polygon as defined by the floor contact point other than the foot sole and the floor surface.

The ZMP is a point about which the moments applied to the robot body are equal to zero, as discussed above. Basically, the ZMP is inside a support polygon defined by the floor contact points of the foot soles and the floor surface. The ZMP stable area is set further inside this support polygon. The robot body may be in a highly stabilized state by having the ZMP accommodated in this ZMP stable area.

The ZMP trajectory during the foot unit motion is set, based on the foot unit motion and the ZMP stable area (step S63). Meanwhile, if the point of contact of the robot with the floor surface is not the foot sole, as when the robot performs floor exercise or handstand, the ZMP trajectory is set, based on the support polygon as defined by the floor contact point other than the foot sole and the floor surface.

Moreover, it is assumed that there is no ZMP within the support polygon, as when the foot unit of the robot has cleared the floor or that there is no support point for the outside, and an equation of motion is solved in addition to the ZMP equation. Hence, the center-of-gravity motion (translation and rotation) is set (step S91).

Moreover, it is assumed that there is no ZMP within the support polygon, as when the foot unit of the robot has cleared the floor or that there is no support point for the outside, and an equation of motion is solved in addition to the ZMP equation. Hence, the center-of-gravity motion (translation and rotation) is set (step S91).

If desired to suppress posture changes in the robot body at an instant the robot has touched the floor after jumping or after descent from an elevated place, it is sufficient if, directly after the step S91, the imaginary ZMP is calculated and a desired trajectory of the motion pertinent to the part of touchdown is set so that the imaginary ZMP will be in the support polygon formed on touchdown. The 'imaginary ZMP' is the ZMP that can be found as a result of calculations of the ZMP under the assumption that the support polygon actually cannot be formed but a large support polygon is formed on the estimated touchdown floor surface region.

The respective parts of the robot body are grouped, such as waist unit, body trunk, upper limbs and head unit (step S71). As an example of setting of the part groups, shown in FIG. 5, first to seventh part groups, namely a waist unit, a body trunk, a right arm unit, a head unit, a left arm unit, a left leg unit and a right leg unit, are set.

A desired trajectory is set from one part group to another (step S72). The desired trajectory for each part group of the robot body is set off-line, with the aid of, for example, a motion editing system.

The group setting of each part is then adjusted by way of re-grouping (step S73). The order of the priority sequence is accorded to each of the part groups (step S74). The order of the priority sequence here means the order used in the processing calculations for performing posture stabilizing control, and is determined depending on amount of the movable mass or amount of the generatable moment. The result is that a set of desired trajectories, provided with the order of the priority sequence, are completed for each of the respective parts of the robot body. The priority sequence $\rho$ is formed by six elements, namely a pitch axis priority sequence $\rho_p$, a roll axis priority sequence $\rho_r$, a yaw axis priority sequence $\rho_{yaw}$, an X-axis priority sequence $\rho_x$, a Y-axis priority sequence $\rho_y$, and a Z-axis priority sequence $\rho_z$. The order in the priority sequence for each part is determined by referencing a pre-drafted action schedule, in addition to amount of the movable mass or amount of the generatable moment. At this time, the conditions for connection of the respective parts, such as local coordinate connection, position-fixed connection to the world coordinate of the specified part or posture connection to the world coordinate of the specified parts, are also set. The priority sequence may also be varied at time t.

For each part group of the robot body, the weight mass usable for moment compensation and force compensation is calculated (step S75). In the instance shown in FIG. 5, in which the right leg is the leg in stance and the ZMP position $P_{ZMP}$ is on the right leg unit, the weight mass $M_i$ usable for moment compensation in each part group is as described above.

Based on the motion of the floor contact parts, such as the foot unit, the ZMP trajectory and the set of the desired trajectories of each of the part groups of the robot body, the motion patterns of the respective part groups are put into the posture stabilizing processing.

In this posture stabilizing processing, an initial value of 1 is substituted in a processing variable i (step S80). The amount of the moment on the target ZMP, that is, the amount of total moment compensation $\Omega$ and the amount of force compensation $\Gamma$ in case the target trajectory has been set on each of the part groups, are calculated (step S81), as shown in the equations (17), (18):

$$\Omega = \sum_i^{all\_particles} m_i(r_i - P_{zmp}) \times \ddot{r}_i - \sum_j M_j - \sum_k (S_k - P_{zmp}) \times F_k \quad (17)$$

-continued $$\begin{cases} \Gamma = \sum_{i}^{all\_particles} m_i \ddot{r}_i - M_c \ddot{r}_c - \sum_{j} M_j/(S_k - P_{zmp}) - \sum_{k} F_k \\ M_c: \text{total weight mass} \\ \ddot{r}_c: \text{target acceleration of center of gravity} \end{cases} \quad (18)$$

It is noted that the amount of total moment compensation $\Omega$ is the sum of the amount of moment on the target ZMP of the totality of the part groups plus the moment of the unknown external force and the unknown external force, defined in the above equations, as known terms, and that the amount of force compensation $\Gamma$ is the sum of the amount of force compensation on the target ZMP of the totality of the part groups plus the moment of the unknown external force and the unknown external force, defined in the above equations, as known terms.

For the part where the target trajectory is not calculated, a desired trajectory is used.

Then, using the weight mass $M_j$, calculated by the step S75, and which is usable for moment compensation and force compensation of the part i in question, an absolute moment compensation amount coefficient $\alpha_i$ and an absolute force compensation amount coefficient $\chi_i$ are set (step S82), and the amount of moment compensation $\Omega_i$ and the amount of force compensation $\sigma_i$ are calculated in accordance with the following equation (19) (step S83):

$$\begin{cases} \Omega_i = \frac{\alpha_i}{\sum_{i}^{n} \alpha_i} \\ \Gamma_i = \frac{\chi_i}{\sum_{i}^{n} \chi_i} \Gamma \\ \alpha_i = \beta_i \times \frac{M_i}{\sum_{i=1}^{n} M_i}, \text{ in which, } \sum_{i=1}^{n} \alpha_i = 1.0, \beta_i: \\ \text{amount of relative moment compensation} \\ \chi_i = \delta_i \times \frac{M_i}{\sum_{i=1}^{n} M_i}, \text{ in which, } \sum_{i=1}^{n} \chi_i = 1.0, \delta_i: \\ \text{amount of relative force compensation} \end{cases} \quad (19)$$

Then, using the amount of moment compensation $\Omega_i$ and the amount of force compensation $\Gamma_i$ of the i'th part, as calculated, the ZMP equation for the i'th part, shown in the following equation (20), the equation of motion pertinent to rotation at the center of gravity, shown in the following equation (24) to follow, and the equation of motion pertinent to translation, shown in the following equation (21), are derived (step S84).

total mass points usable by the i'th site for moment compensation  (20)
$$\sum_{i} m_i(\Delta r_i - P_{zmp}) \times \Delta \ddot{r}_i + \Omega_i = 0$$

total mass points usable by the i'th site for force compensation  (21)
$$\sum_{i} m_i \Delta \ddot{r}_i + \Gamma_i = 0$$

However, with the above ZMP equation, containing many unknown variables, it is difficult to find a solution by analytical routes or by numerical calculations. Thus, an approximate ZMP equation, indicated by the following equation (22), or an approximate equation of motion, pertinent to rotation at the center of gravity, indicated by the following equation (25), in which the target center-of-gravity trajectory $r_{Mi}$ of the weight mass usable for the moment compensation and force compensation of the i'th part, respectively, are known variables, and in which an amount of change $\Delta r_{Mi}$ of the weight mass, usable for moment compensation of the i'th part, with respect to the target center-of-gravity trajectory, and the modified acceleration (two order differentiation of $\Delta \mu_{Mi}$ with respect to time) are unknown variables, is derived. In addition, an equation of motion pertinent to translation, indicated by the following equation (23), is derived. In the above equations, $r_{Mi}$ is the position vector of the center of gravity of the weight mass $M_i$ usable for moment compensation in the i'th part group.

$$M_i(\Delta r_{Mi} - P_{zmp}) \times \Delta \ddot{r}_{Mi} + \Omega_i = 0 \quad (22)$$

$$M_i \Delta \ddot{r}_{Mi} + \Gamma_i = 0 \quad (23)$$

total mass points usable by the i'th site for moment compensation  (24)
$$\sum_{i} m_i(\Delta r_i - r_c) \times \Delta \ddot{r}_i + \Omega_i = 0$$

$$M_i(\Delta r_{Mi} - r_c) \times \Delta \ddot{r}_{Mi} + \Omega_i = 0 \quad (25)$$

The equations, thus derived, now must be solved simultaneously. However, in the case of the legged mobile robot, in which the respective links are interconnected by rotational joints, the above equations co-own the movements in the Z-direction, and hence represent non-linear two order differential equations, presenting interferences, so that these equations are difficult to solve analytically.

Thus, it is assumed that the equations do not co-own the motion in the Z-direction. The equation (23) is rendered non-linear and free of interferences, and an approximate solution $r_{iMi}$ of the target center-of-gravity trajectory of the weight mass usable for force compensation of the i'th part is calculated. The amount of change $\Delta r_i$ of each mass point $r_i$ of the i'th part, that may be calculated from the approximate solution, is substituted in the strict equation of motion (21) to calculate a force compensation error. This error is then inverted in sign and accumulated in the right side of the equation (23) previously rendered non-linear and free of interferences.

Then, $r_{iMi}$ (known variable as calculated)$-r_{Mi}$ (known variable)$+\Delta r_{Mi}$ (unknown variable) is substituted for $\Delta r_{Mi}$ (unknown variable) and an approximate solution of the amount of change $\Delta r_{Mi}$ with respect to the target center-of-gravity trajectory of the weight mass usable for moment compensation of the i'th part from the previously calculated target center-of-gravity trajectory is calculated. Specifically, the Z-axis motion is assumed to be not co-owned and the equation (22) or (25) is rendered non-linear and free of interferences to calculate the approximate solution of the target center-of-gravity trajectory of the weight mass usable for moment compensation of the i'th part. The amount of change $\Delta r_i$ of each mass point $r_i$ of the i'th part, that may be calculated from the approximate solution, is substituted in the strict equation of motion (20) or in the above equation (24) to calculate a moment compensation error. This error is then inverted in sign and accumulated in the right side of the equation (22) or (25) previously rendered non-linear and free of interferences.

An approximate solution of the target center-of-gravity trajectory of the weight mass usable for force compensation of the i'th part is again calculated. The amount of change $\Delta r_i$ of each mass point $r_i$ of the i'th part, that may be calculated from the approximate solution, is substituted in the strict equation of motion (21) to calculate a force compensation error. This error is then inverted in sign and accumulated in the right side of the equation (23) previously rendered non-linear and free of interferences.

Then, $r_{iMi}$ (known variable as calculated)–$r_{Mi}$ (known variable)+$\Delta r_{Mi}$ (unknown variable) is substituted for $\Delta r_{Mi}$ (unknown variable) and an approximate solution of the target center-of-gravity trajectory of the weight mass usable for force compensation of the i'th part is calculated. The amount of change $\Delta r_i$ of each mass point $r_i$ of the i'th part, that may be calculated from the approximate solution, is substituted in the strict equation of motion (20) or in the above equation (24) to calculate a moment compensation error. This error is then inverted in sign and accumulated in the right side of the equation (22) or (25) previously rendered non-linear and free of interferences.

By repeating the above operations until the error becomes not larger than an allowable value, it is possible to calculate the compensation movement of the moment, in addition to the force of the part in question (step S85). In this manner, the target trajectory pertinent to the i'th part as counted from the leading part in terms of the order of the priority sequence may be obtained.

In general, it is sufficient to calculate the motion which satisfies the ZMP equation or the motion of equation. However, there are occasions where the equations (20) and (21) must be satisfied simultaneously, such as when the robot is in takeoff or in touchdown state in case of jumping or running.

Meanwhile, in calculating the trajectory of each mass point of an i'th part from the approximate solution of the target center-of-gravity trajectory of the weight mass usable for moment compensation or force compensation of the i'th part, an operating point is set at an optional i'th part, a center-of-gravity vector C (X, Y, Z, $\theta_x$, $\theta_y$, $\theta_z$), having the translational positions (X, Y, Z) or the rotational angles ($\theta_x$, $\theta_y$, $\theta_z$) as unknown variables, is derived. An equation C (X, Y, Z, $\theta_x$, $\theta_y$, $\theta_z$)=$r_{iMi}$ in which the center-of-gravity vector C (X, Y, Z, $\theta_x$, $\theta_y$, $\theta_z$) is arranged as an unknown variable on the left side and in which $r_{Mi}$ is arranged as a known variable on the right side, is derived, and the solution of this equation is calculated.

There are occasions where, depending on the degree-of-freedom configuration of the i'th part, the motion which satisfies the priority sequence $\rho$ ($\rho_p$, $\rho_r$, $\rho_{yaw}$, $\rho_x$, $\rho_y$, $\rho_z$) does not exist, as when there is no degree of freedom of motion along the pitch axis direction or along the roll axis direction suffering from interference against X-axis motion or Y-axis motion only to a lesser extent. In such case, the processing needs to revert to the step S61, S72 or S74 to re-set the relevant items.

Moreover, there are occasions where, depending on the posture of the i'th part, there is produced a marked difference in the error converging rate in the iterative calculations of the respective elements of the priority sequence $\rho$ ($\rho_p$, $\rho_r$, $\rho_{yaw}$, $\rho_x$, $\rho_y$, $\rho_z$) such that the strict solution of the equation of the element with a slow error converging rate is not found and the strict solution of the equation of the element with a fast error converging rate is first found. In such case, the error in the amount of each moment compensation or the error in the amount of each force compensation, calculated in the strict equation, needs to be multiplied with converging rate adjustment coefficients $\mu$ ($\mu_p$, $\mu_r$, $\mu_{yaw}$, $\mu_x$, $\mu_y$, $\mu_z$) and the results are accumulated in the right sides of the respective approximate equations for homogenizing the error converging rate.

The above processing is carried out for the totality of the part groups to generate whole-body movements, such as walking.

[Supplement]

The present invention has so far been elucidated by referring to particular embodiments thereof. It is however apparent that various corrections or substitutions of the above-described embodiments may be made without departing form the scope of the invention.

The purport of the invention is not limited to a product termed a 'robot'. That is, the present invention is equally applicable to mechanical devices or other general mobile products performing the movement similar to the motion of human beings, using electrical or magnetic actions, such as a toy.

In sum, the present invention has so far been disclosed from the perspective of illustration, and hence the scope of the present invention should be defined in light of the claims without being construed in a limiting fashion.

INDUSTRIAL APPLICABILITY

According to the present invention, described above, there may be provided a method and an apparatus optimum for controlling the operation of the robot apparatus, and a computer program, in which the target trajectory for each part on the robot body may be corrected to compensate the unknown external moment or unknown external force.

According to the present invention, there may be provided a method and an apparatus optimum for controlling the operation of the robot apparatus, and a computer program, in which the moment error applied to the robot body about the roll, pitch and yaw axes during the robot's movements, such as walking, may be canceled out with advantage by concerted operations of the respective part groups making up the robot body.

According to the present invention, there may be provided a method and an apparatus optimum for controlling the operation of the robot apparatus, and a computer program, in which moment errors applied to the robot body about the roll, pitch and yaw axes may be canceled out with advantage even when the apparatus clears the floor surface, such as during jumping or descending from an elevated place.

The invention claimed is:

1. A motion controlling apparatus for a robot apparatus having at least a plurality of movable parts, said motion controlling apparatus comprising:

ZMP (zero movement point) equilibrium equation generating means for generating a ZMP equilibrium equation stating the relationship of equilibrium of moments applied to a robot body of the robot apparatus;

moment error calculating means for calculating moment errors according to the ZMP equilibrium equation and target trajectories of respective parts of the robot body;

priority sequence order setting means for setting the orders of the priority sequence of said respective parts, the target trajectories of which are to be corrected for canceling out the moment error; and trajectory correction means for correcting the target trajectories of the respective parts in a sequence prescribed by said priority sequence so set to compensate the moment error.

2. The motion controlling apparatus for a robot apparatus according to claim 1, wherein said priority sequence order setting means accords the orders of the priority sequence for correcting the target trajectories to said parts in the sequence of the decreasing amount of the movable mass or in the sequence of the decreasing amount of the generatable moment.

3. The motion controlling apparatus for a robot apparatus according to claim 1,
wherein said priority sequence order setting means accords the orders of the priority sequence for correcting the target trajectories to said parts by referring to a pre-drafted action schedule.

4. The motion controlling apparatus for a robot apparatus according to claim 1,
wherein said ZMP equilibrium equation generating means derives a ZMP equation for each of the pitch, roll and yaw axes; said trajectory correction means correcting the target trajectories of the respective parts for each of the pitch, roll and yaw axes to compensate the moment error.

5. The motion controlling apparatus for a robot apparatus according to claim 1, further comprising:
center-of-gravity movement setting means for setting the center-of-gravity motion pertinent to translation and/or rotation of said robot body when both foot units of said robot apparatus clear the floor surface,
wherein said moment error calculating means calculates the amount of force compensation in a target center of gravity, in addition to the moment error in said ZMP equilibrium equation,
wherein said priority sequence order setting means sets a priority sequence for said parts the target trajectories of which are corrected to cancel out the moment error and the amount of force compensation, and
wherein said trajectory correction means corrects the target trajectories for each part in a sequence corresponding to said priority sequence so set to compensate the moment error and the amount of force compensation.

6. A motion controlling method for a robot apparatus having at least a plurality of movable parts, said motion controlling method comprising:
a ZMP equilibrium equation generating step of generating a ZMP equilibrium equation stating the relationship of equilibrium of moments applied to a robot body of the robot apparatus;
a moment error calculating step of calculating moment errors according to the ZMP equilibrium equation and target trajectories of respective parts of the robot body;
a priority sequence order setting step of setting the orders of the priority sequence of said respective parts, the target trajectories of which are to be corrected for canceling out the moment error; and
a trajectory correction step of correcting the target trajectories of the respective parts in a sequence prescribed by said priority sequence so set to compensate the moment error.

7. The motion controlling method for a robot apparatus according to claim 6,
wherein said priority sequence order setting step accords the orders of the priority sequence for correcting the target trajectories to said parts in the sequence of the decreasing amount of the movable mass or in the sequence of the decreasing amount of the generatable moment.

8. The motion controlling method for a robot apparatus according to claim 6,
wherein said priority sequence order setting step accords the orders of the priority sequence for correcting the target trajectories to said parts by referring to a pre-drafted action schedule.

9. The motion controlling method for a robot apparatus according to claim 6,
wherein said ZMP equilibrium equation generating step derives a ZMP equation for each of the pitch, roll and yaw axes; said trajectory correction step correcting the target trajectories of the respective parts for each of the pitch, roll and yaw axes to compensate the moment error.

10. The motion controlling method for a robot apparatus according to claim 6 further comprising:
a center-of-gravity movement setting step of setting the center-of-gravity motion pertinent to translation and/or rotation of said robot body when both foot units of said robot apparatus clear the floor surface,
wherein said moment error calculating step calculating the amount of force compensation in a target center-of-gravity position, in addition to the moment error in said ZMP equilibrium equation,
wherein said priority sequence order setting step setting a priority sequence for said parts the target trajectories of which are corrected to cancel out the moment error and the amount of force compensation, and
wherein said trajectory correction step correcting the target trajectories for each part in a sequence corresponding to said priority sequence so set to compensate the moment error and the amount of force compensation.

11. A recording medium storing a computer program, which, when executed, allows the operation control for a robot apparatus having at least a plurality of movable parts to be processed on a computer system, said program comprising:
a ZMP equilibrium equation generating step of generating a ZMP equilibrium equation stating the relationship of equilibrium of moments applied to a robot body of the robot apparatus;
a moment error calculating step of calculating moment errors according to the ZMP equilibrium equation and target trajectories of respective parts of the robot body;
a priority sequence order setting step of setting the orders of the priority sequence of said parts the target trajectories of which are to be corrected for canceling out the moment error; and
a trajectory correction step of correcting the target trajectories of the respective parts in a sequence prescribed by said priority sequence so set to compensate the moment error.

* * * * *